US009107085B1

(12) United States Patent
Wu

(10) Patent No.: US 9,107,085 B1
(45) Date of Patent: Aug. 11, 2015

(54) IDENTIFYING SUSPECTS AND WITNESS TO SHOOTING BASED ON EXAMINATION OF CALLS MADE AFTER SHOOTING

(71) Applicant: Polaris Wireless, Inc., Mountain View, CA (US)

(72) Inventor: Jeffrey Noel Wu, Santa Clara, CA (US)

(73) Assignee: Polaris Wireless, Inc., Mountain View, CA (US)

(*) Notice: Subject to any disclaimer, the term of this patent is extended or adjusted under 35 U.S.C. 154(b) by 371 days.

(21) Appl. No.: 13/740,317

(22) Filed: Jan. 14, 2013

(51) Int. Cl.
*H04W 4/02* (2009.01)
*H04W 24/00* (2009.01)

(52) U.S. Cl.
CPC .................... *H04W 24/00* (2013.01)

(58) Field of Classification Search
CPC ....................................... H04W 4/22
USPC ......................................... 455/404.2
See application file for complete search history.

(56) References Cited

U.S. PATENT DOCUMENTS

| 7,817,789 | B2* | 10/2010 | Ferguson et al. | 379/112.04 |
| 7,855,935 | B1 | 12/2010 | Lauder et al. | |
| 8,219,110 | B1* | 7/2012 | White et al. | 455/456.1 |
| 2010/0093305 | A1* | 4/2010 | Reich et al. | 455/404.1 |
| 2011/0117878 | A1* | 5/2011 | Barash et al. | 455/404.2 |
| 2011/0169633 | A1* | 7/2011 | Lauder et al. | 340/539.13 |
| 2012/0115431 | A1* | 5/2012 | Kim et al. | 455/404.1 |
| 2014/0162583 | A1* | 6/2014 | Daly et al. | 455/404.1 |

* cited by examiner

*Primary Examiner* — Christopher M Brandt
(74) *Attorney, Agent, or Firm* — Kaplan Breyer Schwarz & Ottesen, LLP

(57) ABSTRACT

An illustrative telecommunications analysis server analyzes telecommunications-event records and telecommunications-activity records associated with mobile stations operating in one or more wireless networks to infer whether a spike in initiated telecommunications activities occurred in a period of time and from a geographic area that closely correlate with the time and location of an audio incident. The server corroborates that the audio incident likely occurred based on the inferred spike in initiated telecommunications activities from one or more mobile stations. The illustrative server identifies the mobile stations that were likely within earshot of the incident and actively initiating telecommunications immediately thereafter.

30 Claims, 13 Drawing Sheets

IDENTIFYING SUSPECTS AND WITNESS TO SHOOTING BASED ON EXAMINATION OF CALLS MADE AFTER SHOOTING

FIELD OF THE INVENTION

The present invention relates to wireless networks in general, and, more particularly, to telecommunications activity analysis.

BACKGROUND OF THE INVENTION

Technologies exist in the prior art for detecting audio incidents that breach the peace such as a shooting, an explosion, a blast, etc. Typically, audio detectors that are deployed throughout a geographic area report sensed data to a central station. The information reported by the audio detector(s) is processed and the central station determines whether a relevant audio incident occurred, such as a shooting, or, on the other hand, whether the incident represents something benign such as a car back-firing or construction noise. A bona-fide breach-of-the-peace incident is typically reported by the central station to law enforcement authorities to alert first responders and help in an investigation. The location and time of the audio incident are important elements of the incident report.

One operational issue that arises in the prior art is the incidence of errors in accurately classifying the audio incident as benign or otherwise. A benign incident that is wrongly classified as a shooting or other breach-of-the-peace will result in wasted law enforcement and first-responder resources. Conversely, a bona-fide breach-of-the-peace incident that is misclassified as benign can possibly result in loss of life, serious injury, property damage, and delayed justice.

One technique in the prior art attempts to correlate weapon fire incidents with persons of interest and location data in an attempt to identify persons who might have been at the scene of the weapons fire. See, e.g., U.S. Pat. No. 7,855,935 and U.S. Patent Application Publication No. 2011/0169633 A1. However, one important deficiency of these prior art techniques is that they lack precision in identifying people who might have witnessed or even perpetrated the incident, and, as a result, tend to be overinclusive; this has the unfortunate effect of identifying people who in fact were not present at the scene at the time of the incident or who simply did not hear the incident. Also, as mentioned, these prior art techniques may give rise to false alarms when a benign audio incident is misclassified. Therefore a new approach is needed.

SUMMARY OF THE INVENTION

The present inventor recognized that one way to address classification errors in processing an audio incident is to find corroboration. One way to find corroboration is to check for impromptu telecommunications activities that immediately follow the audio incident. The inventor's theory is that a person who witnesses or hears a benign audio incident such as a car back-firing will simply ignore it and go about their ordinary business; however, when the person witnesses or hears a nearby shooting or explosion or some other bona-fide breach of the peace, the person will immediately contact someone else, possibly a loved one, and not necessarily rush to call law enforcement. For example, the person might immediately call a spouse or child; the person might send text messages to loved ones; or the person might initiate a data session to email or tweet about the incident. A person might eventually call 911, but might never do so. A perpetrator will never call law enforcement, but might immediately call or text an accomplice. Therefore, the inventor recognized that people's immediate response to an incident is likely to telecommunicate with others and in so doing generate one or more records that capture the telecommunications activity. This applies to both wired and wireless telecommunications.

The inventor also recognized that the mere fact that someone's mobile station can be located in the vicinity of an audio incident does not mean that the user is necessarily there and able to hear the incident. Such a user would be captured by prior-art techniques that are based solely on the mobile station's location, but this approach is overinclusive. Instead, according to the present invention, this user would have to affirmatively initiate a telecommunications activity immediately following the audio incident in order to be designated a candidate. This approach may yield underinclusive results as compared to the prior art by leaving out people who might have been in the area but did not actively telecommunicate after the incident. However, the present approach has the substantial advantage that it identifies mobile stations with confirmed active users, who are more likely to be useful in the ensuing investigation, whether as witnesses, victims, or perpetrators. Moreover, the present approach also presents performance advantages that reduce the amount of network-based traffic and the computational burden on location-estimation systems.

A person can experience an audio incident as a witness, bystander, victim, and/or perpetrator. When initiating a telecommunications activity from a mobile station such as originating a call, transmitting a text message, and/or originating a data session that immediately follows the person's experiencing of the audio incident, the person causes telecommunications events to be generated within the wireless network serving the user; some of these events cause the mobile station to transmit information to the wireless network in so-called "network management reports" or "telecommunications-event records." The information in one or more network management reports received from a given mobile station is used by the wireless network for call management and handovers, but can also be exploited by the present invention. The wireless network additionally generates records of the initiated telecommunications activity ("telecommunications-activity records"), such as call detail records, text messaging records, data session records, etc., which are typically used for call management and call accounting. If properly captured and analyzed, network management reports and telecommunications-activity records can be used by the illustrative embodiment not only to corroborate that a relevant audio incident has actually occurred (i.e., is not merely business-as-usual), but can be further exploited to identify mobile stations that were likely within earshot of the audio incident when they initiated the telecommunications activity.

The illustrative system comprises a telecommunications analysis server that, according to an illustrative method, determines whether a spike in initiated telecommunications activities occurred in a period of time and from a geographic area that closely correlate with the time and location of an audio incident. Rather than analyzing existing active calls that started before the audio incident and probably bear no relation to it, the illustrative server singles out user-initiated activity that follows the audio incident, such as originated calls, originated text messages, originated data sessions, and user-ended calls. These types of telecommunications activity can only be initiated by a mobile station's user and might possibly correlate to the user experiencing a relevant audio incident. According to the illustrative method, the time and location of the audio incident are the basis for launching an analysis of network management reports corresponding to the rough geographic area comprising the incident's location. Telecommunications-activity records, if available from the network, also can be used. The illustrative server infers whether a spike in initiated telecommunications activities occurred immediately following the incident; if so, the illustrative server identifies the mobile stations that were likely within earshot of the incident and actively initiated telecommunications immediately thereafter.

One of the key enablers of the illustrative telecommunications analysis server and methods is the availability of mobile-station location technologies (wireless location estimation systems or location engines) that are independent of the audio incident detection system and its component audio sensors. This autonomy provides important corroborative value that reduces the chances of a false alarm when an audio incident is reported.

Every wireless network operator can equip its wireless network with at least one wireless location system (location engine) that estimates the location of a mobile station when it originates a call, a text, or a data session or when it actively ends an existing call. Although numerous other geo-location technologies exist in the prior art, the disclosed embodiment comprises radio-frequency "fingerprinting" technology that is based on empirical radio-frequency measurements reported by each mobile station to its serving base transceiver station in one or more network management reports or telecommunications-event records; these reported measurements enable the wireless location system to estimate with good accuracy where the mobile station is located. Other useful information can also be gleaned from the telecommunications-event records, such as dialed digits, a destination address, the originating station's identifier, etc. These functions can be executed without modifications to wireless network infrastructure (e.g., wireless switching center, base station controller, base transceiver station, etc.) and without upgrades to existing mobile stations, and are accomplished through software-only features or via passive probe units installed in the wireless network.

Additionally, the present invention also works with call reporting generated by elements of the wireless network such as a wireless switching center. For example, instead of or in addition to the telecommunications-event records available from the reporting mobile stations, telecommunications-activity records from one or more wireless switching centers in the network can also be delivered to the illustrative telecommunications analysis server for analysis. In this way, the illustrative telecommunications analysis server can determine the fact that a user-initiated telecommunications activity occurred and glean the dialed digits, a destination address, the originating station's identifier, etc. from the telecommunications-activity records in order to perform the disclosed functionality in whole or in part.

In sum, according to the present invention, the location estimate coupled with other information extracted from tele-communication-event records and/or from network-generated telecommunications-activity records are advantageously exploited (i) to corroborate that a relevant audio incident occurred and thus reduce false alarms, (ii) to identify those who were active and likely within earshot of the audio incident, e.g., witnesses, bystanders, victims, perpetrators, and (iii) optionally to reduce the rate of false positive identifications by pruning the list of candidate mobile stations to only those who actively telecommunicated immediately following the audio incident.

An illustrative method comprises:
receiving, by a server, an indication of a location L and an indication of a time T;
identifying, by the server, at least one cell in a wireless network that serves a geographic area G that comprises location L;
inferring by the server, based on a plurality of telecommunications event records for the identified at least one cell, that a spike in initiated telecommunications activities occurred during a period of time P that follows the time T, wherein the spike comprises a first telecommunications activity that was initiated by a first mobile station; and
transmitting, based on an estimated location of the first mobile station when the first mobile station initiated the first telecommunications activity, an indication that the first mobile station was located within the geographic area G at the time T.

An illustrative apparatus comprises:
a receiver that is configured to receive an indication of a location L and an indication of a time T;
a processor that is configured to:
identify at least one cell in a wireless network that serves a geographic area G that comprises the location L,
infer, based on a plurality of telecommunications event records for the identified at least one cell, that a spike in initiated telecommunications activities occurred during a period of time P that follows the time T, wherein the spike comprises a first telecommunications activity that was initiated by a first mobile station, and wherein the first telecommunications activity comprises at least one of (i) a call origination, (ii) a text message transmission, and (iii) a data session origination, and
when determining that an estimated location of the first mobile station during the period P is within an earshot distance of the location L, generate an indication that the first mobile station was located within earshot of the location L at the time T; and
a transmitter that is configured to transmit the indication.

An illustrative method comprises:
receiving, by a server, an indication of a location L and an indication of a time T;
identifying, by the server, at least one cell in a wireless network that serves a geographic area G that comprises location L;
inferring by the server, based on a plurality of telecommunications activity records for the identified at least one cell, that a spike in initiated telecommunications activities occurred during a period of time P that follows the time T, wherein the spike comprises a first telecommunications activity that was initiated by a first mobile station; and
transmitting by the server an indication that the spike in initiated telecommunications activities occurred after time T.

An illustrative apparatus comprises:
a processor that is configured to:
infer, based on a plurality of telecommunications activity records for a cell in a wireless network, that a spike in initiated telecommunications activities occurred in the cell during a period of time P, wherein the spike comprises a first telecommunications activity that was initiated by a first mobile station,
identify a geographic area G that is served by the cell,
determine that a sufficient correlation exists between (i) a time T and a location L that define an audio incident and (ii) the period of time P and the geographic area G, respectively, wherein the period of time P follows the time T, and further wherein the geographic area G comprises the location L, and cause a transmitter to transmit, based on determining that the correlation is sufficient, an indication that the spike corroborates the occurrence of the audio incident; and the transmitter that is configured to transmit the indication.

DETAILED DESCRIPTION

Figure 1A:
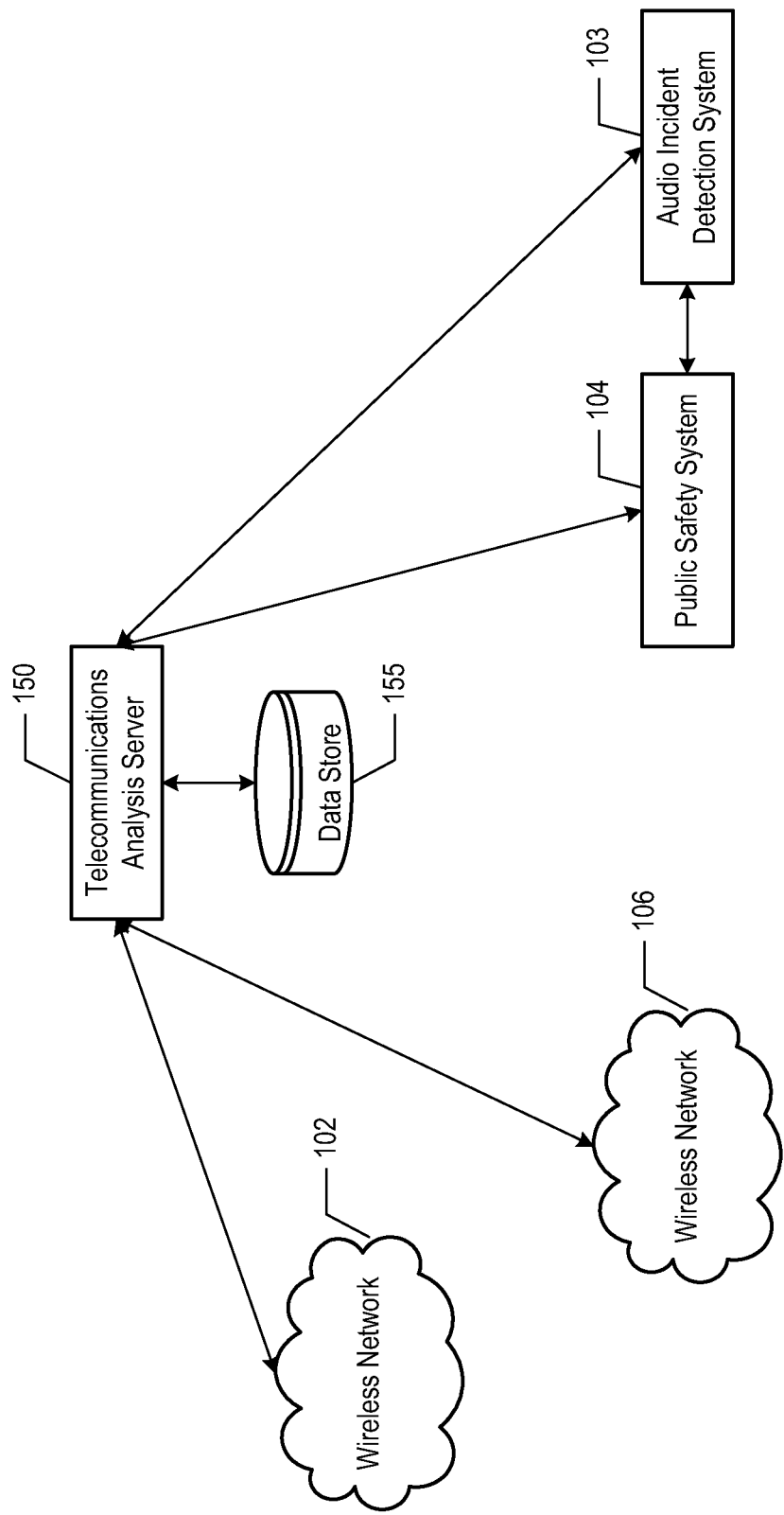
FIG. 1A depicts a schematic diagram of a portion of telecommunications analysis system 100 according to an embodiment of the present invention.

For the purposes of this specification, the following terms and their inflected forms are defined as follows:
1. A "location" is defined as any one of a zero-dimensional point, a one-dimensional line, a two-dimensional area, or a three-dimensional volume. Thus, a location can be described, for example, by a street address, geographic coordinates ("geo-location"), a perimeter, a geofence, a cell ID of a wireless network, or an enhanced cell ID in a wireless network.
2. A "geofence" is defined as a virtual perimeter surrounding a geographic area.
3. A "mobile station" is defined as an apparatus that:
    receives signals from another apparatus without a wire, or
    transmits signals to another apparatus without a wire, or both (i) and (ii).
    This term is used synonymously herein with: wireless terminal, wireless telecommunications terminal, user equipment, mobile terminal, mobile phone, cellular phone, cell phone, mobile handset, mobile communication handset, and mobile unit.
4. A "telecommunications activity" in reference to a mobile station is defined as any of the following occurrences at the mobile station:
    a call origination by the mobile station, e.g., the mobile user makes a call to another party,
    a call termination at the mobile station, e.g., the mobile user receives a call from another party,
    a text transmission by the mobile station, e.g., the mobile user sends a text message (e.g., SMS) from the mobile station,
    a text termination at the mobile station, e.g., the mobile station receives a text message (e.g., SMS) from another mobile station,
    a packet data session origination by the mobile station, e.g., the mobile user goes online to access a web site, or establishes a data session to check email,
    a call release or disconnect, e.g., the mobile station's user disconnects (ends) an active call, or abandons the process of dialing a call, or the call "drops" per haps due to a loss of signal.
5. A telecommunications activity as defined herein gives rise to a "telecommunications-activity record" (synonymous herein with "call-activity record") that is generated by one or more elements of the network, illustratively by the wireless switching center, upon the occurrence of the respective telecommunications activity, e.g., when a call is originated, when a text is transmitted, etc. A telecommunications-activity record comprises at least one identifier of the originating mobile station, e.g., telephone number, IMSI, IMEI, IP address, etc.; at least one identifier of the destination, e.g., telephone number, IMSI, IMEI, IP address, etc.; the time of the activity, e.g., start time of an originated call, transmission time of a transmitted text, start time of a data session, etc.; and an indication of the nature of the activity such as voice call, text message, data session.
6. An "initiated telecommunications activity" is defined as a telecommunications activity that is affirmatively initiated by the user of the subject mobile station. Only telecommunications activities that require the user to take action at the mobile station are designated "initiated telecommunications activities," and comprise one or more of:
    a call origination by the mobile station, e.g., the mobile user makes a call to another party,
    a text transmission by the mobile station, e.g., the mobile user sends a text message (e.g., SMS) from the mobile station,
    a data session origination by the mobile station, e.g., the mobile user initiates a data session such as going online to access a web site or check email,
    a user-initiated call release or disconnect, i.e., the mobile station's user affirmatively disconnects (ends) an active call.
7. A "telecommunications event" is defined as an occurrence at a mobile station that is communicated (e.g., requested, reported) by the mobile station to its serving base transceiver station and from there to the base station controller. Examples of telecommunications events that are typical in a GSM network include without limitation:
    IMSI attach,
    IMSI detach,
    location-area-update,
    call origination,
    text origination,
    data session origination,
    call termination (receiving a call), text termination (receiving a text),
call release or disconnect (ending a call),
handover request,
paging response.
Notably, telecommunications events arise from a variety of causes at the mobile station, and not necessarily because of a user-initiated activity; for purposes of the present disclosure, such non-user-initiated events, e.g., location-area-update, IMSI attach, IMSI detach, etc., are considered to be background maintenance between the mobile station and elements of the wireless network and therefore do not give rise to a telecommunications-activity record as defined herein.

8. A telecommunications event as defined herein gives rise to a "telecommunications-event record" (synonymous herein with "network management report" or "telecommunications-event report") that comprises the information transmitted by the mobile station, upon the occurrence of a telecommunications event, to its serving base transceiver station and from there to the base station controller. Information reported in a telecommunications-event record is available to one or more elements of the wireless network for further processing and analysis, e.g., for resolving the location of the mobile station, for identifying the mobile station that experienced the telecommunications event, for call processing, etc. An illustrative telecommunications-event record comprises at least one identifier of the transmitting mobile station, e.g., telephone number, IMSI, TMSI, IMEI, etc.; empirical signal-strength measurements measured by the mobile station of signals received by the mobile station from the serving base transceiver station and also from other base transceiver stations and/or antennas in the wireless network, such as signals from so-called "neighbor cells;" and dialed digits, feature activations, or other user input to be processed by the network.

Other terms may be defined elsewhere in the present disclosure.

FIG. 1A depicts a schematic diagram of a portion of telecommunications analysis system 100 according to an illustrative embodiment of the present invention. Telecommunications analysis system 100 comprises data store 155 and telecommunications analysis server 150, which is interconnected as shown to public safety system 104, wireless network 102, wireless network 106, and audio incident detection system 103. According to the illustrative embodiment, telecommunications analysis system 100 does not comprise illustrated elements 102, 103, 104, and 106, but it will be clear to those having ordinary skill in the art, after reading the present disclosure, how to make and use alternative embodiments wherein telecommunications analysis system 100 comprises one or more of these elements, e.g., comprises public safety system 104, comprises wireless network 102, and/or comprises audio incident detection system 103.

It will be clear to those having ordinary skill in the art, after reading the present disclosure, how to make and use alternative embodiments wherein telecommunications analysis server 150 is differently connected to the other illustrated systems and networks, e.g., via the public switched telephone network, via the Internet, via one or more private data networks, via a combination thereof, etc. It will be further clear to those having ordinary skill in the art, after reading the present disclosure, how to make and use alternative embodiments wherein telecommunications analysis system 100 supports any number of wireless networks, e.g., one wireless network, three wireless networks, etc.; a different number and kind of public safety systems, e.g., an emergency 911 handling system, a police dispatch system, and/or a surveillance system, etc.; any number of audio incident detection systems, e.g., two audio detection systems, three audio detection systems, etc. It will be further clear to those having ordinary skill in the art, after reading the present disclosure, how to make and use alternative embodiments wherein telecommunications analysis system 100 comprises one or more systems and networks, e.g., comprises audio incident detection system 103, comprises wireless network 102, etc. It will be further clear to those having ordinary skill in the art, after reading the present disclosure, how to make and use alternative embodiments wherein telecommunications analysis system 100 including its component elements is configured within one of the other systems and/or networks, whether as a logical component, as a physical component, and/or as a fully integrated component, e.g., within public safety system 104, within wireless network 102, within audio incident system 103, etc.

Wireless network 102 provides wireless telecommunications service to a plurality of mobile stations in a manner well known in the art. According to the illustrative embodiment, wireless network 102 provides wireless service in accordance with the air-interface standard of the 3rd Generation Partnership Project ("3GPP"). Examples of 3GPP air-interface standards include GSM, UMTS, and LTE, which are known to those skilled in the art. After reading this disclosure, however, it will be clear to those skilled in the art how to make and use alternative embodiments of the present invention that operate in conjunction with wireless networks under other air-interface standards (e.g., CDMA-2000, IS-136 TDMA, IS-95 CDMA, 3G Wideband CDMA, IEEE 802.11 Wi-Fi, 802.16 WiMax, Bluetooth, etc.) in one or more frequency bands. It will be clear to those having ordinary skill in the art how to recognize and implement the corresponding terms, if any, for non-3GPP types of wireless networks with respect to other embodiments of the present invention.

Audio incident detection system 103 determines whether a relevant audio incident has occurred, e.g., weapons fire, an explosion, etc. See, e.g., U.S. Pat. No. 7,855,935. Audio incident detection system 103 reports the incident's location and time of occurrence according to technology that is well known in the art. According to the illustrative embodiment, audio incident detection system 103 reports the location and time of occurrence to telecommunications analysis server 150 and also to public safety system 104. It will be clear to those having ordinary skill in the art, after reading the present disclosure, how to make and use alternative embodiments of the present invention wherein audio incident detection system 103 does not report directly to public safety system 104.

Public safety system 104 is well known in the art. According to the illustrative embodiment, public safety system 104 is a police dispatch center that receives signals from audio incident detection system 103 reporting on detected audio incidents and also receives signals from telecommunications analysis server 150 as described in further detail below. Although the present figure illustrates only one public safety system 104, it will be clear to those having ordinary skill in the art how to make and build alternative embodiments of the present invention that operate with a plurality of public safety system and with other systems (e.g., emergency 911 center, surveillance system, etc.) that receive reports from telecommunications analysis server 150.

Wireless network 106 provides wireless telecommunications service to a plurality of mobile stations in a manner well known in the art. According to the illustrative embodiment, wireless network 106 provides wireless service in accordance with the air-interface standard of the 3rd Generation Partnership Project ("3GPP"). Examples of 3GPP air-interface standards include GSM, UMTS, and LTE, which are known to those skilled in the art. After reading this disclosure, however, it will be clear to those having ordinary skill in the art how to make and use alternative embodiments of the present invention that operate in conjunction with wireless networks under other air-interface standards (e.g., CDMA-2000, IS-136 TDMA, IS-95 CDMA, 3G Wideband CDMA, IEEE 802.11 Wi-Fi, 802.16 WiMax, Bluetooth, etc.) in one or more frequency bands. It will be clear to those having ordinary skill in the art how to recognize and implement the corresponding terms, if any, for non-3GPP types of wireless networks with respect to other embodiments of the present invention.

Telecommunications analysis server 150 performs and coordinates the operations described in more detail below. According to the illustrative embodiment, telecommunications analysis server 150 performs and coordinates the operations of method 500. Other aspects of telecommunications analysis server 150 and method 500 are described in more detail below and in the accompanying figures.

Data store 155 is a data storage, retrieval, and archiving medium that is well known in the art. Data store 155 stores historical data (e.g., traffic data collected by telecommunications analysis server 150, location estimates generated by location engine 113, etc.) as well as results generated by server 150. It will be clear to those having ordinary skill in the art, after reading the present disclosure, how to make and use alternative embodiments of the present invention without a data store 155, or with any number of data stores 155, e.g., two data stores, three data stores, etc.

It is to be understood that numerous other configurations of telecommunications analysis system 100 in conjunction with one or more other networks (wired and/or wireless) and in conjunction with one or more audio incident detection system can be made and used by those having ordinary skill in the art after reading the present invention.

Figure 1B:
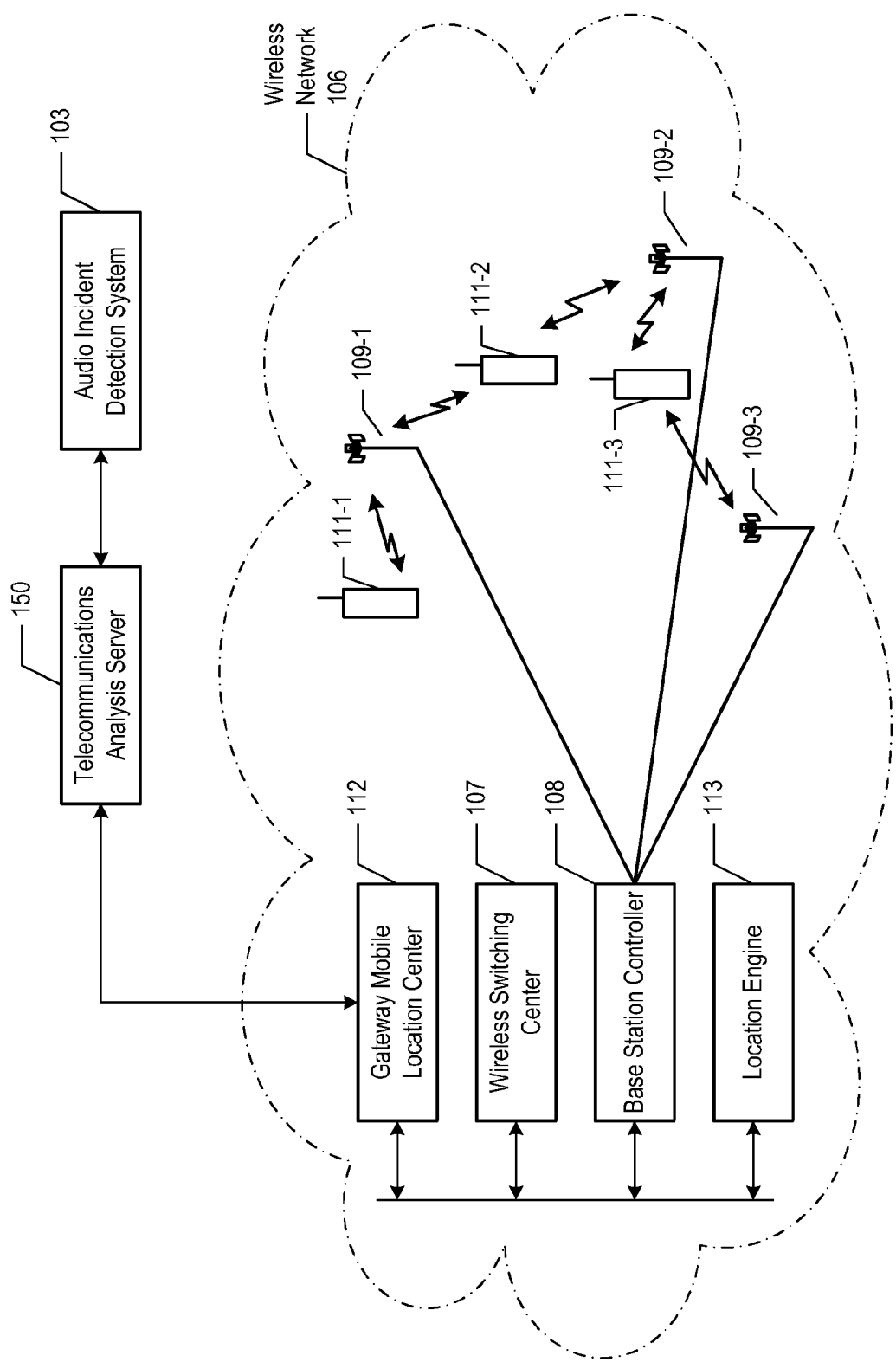
FIG. 1B depicts a schematic of the salient portions of wireless network 106 depicted in FIG. 1A according to the illustrative embodiment of the present invention.

FIG. 1B depicts a schematic of the salient portions of wireless network 106 that is depicted in FIG. 1A. Wireless network 106 comprises the following elements: gateway mobile location center 112, wireless switching center 107, base station controller 108, base transceiver stations 109-1, 109-2, and 109-3 (and other base transceiver stations 109-*i*), and location engine 113. These elements are generally referred to herein as elements of the "network infrastructure." Wireless network 106 provides wireless telecommunications service to mobile stations 111-1, 111-2, and 111-3 (and other mobile stations 111-*k*). Wireless network 106 is interconnected to telecommunications analysis server 150 and audio incident detection system 103 as shown.

Wireless network 106 also comprises other elements, e.g., home location register ("HLR"), visiting location register(s) ("VLR"), etc., that are not depicted here for the sake of simplicity and ease of understanding. Those having ordinary skill in the art will know how such elements operate within wireless network 106, and, after reading the present disclosure, how to make and use embodiments of the present invention that operate with these elements, e.g., what information is available from such elements, how to request information from such elements, how to receive information from such elements, etc.

Wireless network 106 also comprises one or more additional instantiations of the shown elements, e.g., a plurality of wireless switching centers 107, a plurality of base station controllers 108, and optionally a plurality of location engines 113, etc., which are not depicted here for the sake of simplicity. Those having ordinary skill in the art will know how such additional elements operate within wireless network 106, and, after reading the present disclosure, how to make and use embodiments of the present invention that operate with these additional elements, e.g., what information is available from such elements, how to request information from such elements, how to receive information from such elements, etc.

The depicted interconnections among the illustrated elements are simplified for the sake of easing the reader's understanding, but those having ordinary skill in the art will know how to build embodiments of the present invention to interconnect with the illustrated elements of wireless network 106. It will be clear to those having ordinary skill in the art, after reading the present invention, how to interconnect and configure these elements differently in other embodiments while remaining within the scope of the present invention. For example, in some alternative embodiments, telecommunications analysis server 150 operates within the confines of wireless network 106; in some alternative embodiments, telecommunications analysis server 150 is integrated with the location engine 113 element such that one hardware platform supports and executes both the functionality of location engine 113 and the functionality of telecommunications analysis server 150, whether as an element of wireless network 106 or as an element external to wireless network 106.

Wireless switching center 107 comprises a switch that orchestrates providing telecommunications service (including voice, text, and packet data) to mobile stations 111-*k* and, illustratively also orchestrates the flow of information to/from other elements of wireless network 106, e.g., gateway mobile location center 112, base station controller 108, base transceiver stations 109-*i*, home location register (not shown), visiting location register(s) (not shown), location engine 113, and one or more network probe units 115-*i* (see FIG. 1C) as described below and in the accompanying figures. It will be clear to those having ordinary skill in the art, after reading the present disclosure, how to make and use alternative embodiments where the flow of information among the above-mentioned elements is differently controlled and/or differently routed, or is accomplished through direct connections between the respective elements.

As is well known to those skilled in the art, wireless switching centers are also commonly referred to by other names such as mobile switching centers, mobile telephone switching offices, packet data service nodes, general packet radio service ("GPRS") support nodes, etc. It will be clear to those having ordinary skill in the art that, depending on the wireless network configuration and the underlying switching technologies, wireless switching center 107 could comprise a mobile switching center ("MSC") for circuit-switched services and a data support node (e.g., serving GPRS support node) for packet data services that are distinct entities. They are presented herein as a unified entity for the sake of clarity and ease of understanding. In accordance with the illustrative embodiment, the base station controller 108 and all of the base transceiver stations 109-*i* that serve mobile stations 111-*k* are associated with wireless switching center 107. It will be clear to those skilled in the art, after reading this disclosure, how to make and use alternative embodiments of the present invention in which any number of base transceiver stations and base station controllers are associated with any number of wireless switching centers.

Furthermore, as an element of wireless network 106, wireless switching center 107 also generates the "telecommunications-activity records" described above. An illustrative call-activity record comprises some or all of the following information for the mobile station that initiated the reported telecommunications activity:

an International Mobile Subscriber Identity ("IMSI") number that is assigned to the mobile station of the subscriber, or to a removable and swappable subscriber identification module ("SIM") card that is receivable in the mobile station, a Temporary Mobile Subscriber Identity ("TMSI") number that is assigned in place of the IMSI when the mobile station operates in the wireless network, the telephone number assigned to the subscriber's account, sometimes known in the art as the mobile station ISDN ("MSIDN"), the relevant telecommunications activity time, e.g., origination time and/or disconnect time, cell ID or enhanced cell ID information relative to the respective times, e.g., the cell ID of the serving cell that provides service to the mobile station that initiated the telecommunications activity being reported, byte counts for data sessions, destination IP address for data sessions.

One or more analogous destination identifiers are also provided if known, e.g., the called telephone number in a call origination, the destination telephone number of a transmitted text message, and/or the respective IMSI/TMSI. All of the above-enumerated terms in the present paragraph are well known to those having ordinary skill in the art.

It will be clear to those having ordinary skill in the art, after reading the present disclosure, how to make and use alternative embodiments in which the relevant telecommunications-activity records are generated by an entity other than wireless switching center 107, such as by another element of wireless network 106, or by an element outside of wireless network 106, or any combination thereof. According to the illustrative embodiments, any and all relevant telecommunications-activity records are made available to telecommunications analysis server 150 through an appropriate telecommunications connection, illustrated here via gateway mobile location center 112.

Base station controller ("BSC") 108 comprises the hardware and software necessary to be 3GPP-compliant according to the illustrative embodiment and is well known in the art. BSC has a plurality of base transceiver stations 109-$i$ under its control.

Base transceiver stations 109-$i$ (e.g., 109-1, 109-2, 109-3) each comprises the hardware and software necessary to be 3GPP-compliant according to the illustrative embodiment and is well known in the art.

For example and without limitation, base station controller 108 and/or base transceiver stations 109-$i$ are capable of:

measuring one or more traits of each of one or more electromagnetic signals (transmitted by mobile station 111-$k$), and reporting the measurements to location engine 113, detecting one or more of the telecommunications events occurring at mobile station 111-$k$, and transmitting one or more signals, and reporting the transmission parameters of those signals, and reporting telecommunications events to location engine 113, and reporting on telecommunications events that are associated with a mobile station 111-$k$.

Base transceiver stations 109-$i$ communicate with their controlling base station controller 108 via wire, and with mobile stations 111-$k$ via radio frequencies ("RF") in well-known fashion. As is well known to those skilled in the art, base transceiver stations are also commonly referred to by a variety of alternative names such as base stations, cellular base transceiver stations, access points, nodes, network interfaces, cell sites, etc. Although the illustrative embodiment comprises three base transceiver stations 109-$i$, it will be clear to those skilled in the art, after reading the present disclosure, how to make and use alternative embodiments that comprise any number of base transceiver stations 109-$i$.

Additionally, those having ordinary skill in the art will understand that a "cell" is the geographic area that receives wireless service from a particular base transceiver station 109, and that therefore the identity of the serving base transceiver station 109 can be mapped to a corresponding cell or cell identifier ("cell ID"). Therefore the term "serving base transceiver station" is used herein to refer to the particular base transceiver station that provides service to a given mobile station 111, and, correspondingly, the term "serving cell" likewise refers to the geographic area served by the serving base transceiver station. These terms are all understood by persons having ordinary skill in the art. For simplicity, cells are sometimes identified herein by using the identifier of the corresponding base transceiver station 109-$i$.

Mobile stations 111-$k$ (e.g., 111-1, 111-2, 111-3) each comprises the hardware and software necessary to be 3GPP-compliant, to originate and receive voice calls, to end or disconnect voice calls, to originate and receive text messages, to originate data sessions and transmit and receive data via said data sessions, and to perform the processes described below and in the accompanying figures in accordance with the illustrative embodiment. Mobile stations 111-$k$ are mobile and telecommunicate wirelessly. For example and without limitation, mobile stations 111-$k$ each is capable of:

transmitting one or more signals, including voice signals, to cellular base transceiver stations 109-$i$, including reports of telecommunications events experienced by the respective mobile station, such as call originations and call terminations (received), and receiving service from one or more of base transceiver stations 109-$i$, and measuring one or more traits of each of one or more electromagnetic signals (received from one or more base transceiver stations 109-$i$, including from a serving base transceiver station ("serving cell") and also from neighboring base transceiver stations ("neighbor cell"), and reporting the measurements uplink such that they ultimately reach location engine 113, e.g., reporting to the serving base transceiver station.

Illustratively, mobile station 111-1 receives electromagnetic signals from base transceiver station 109-1; mobile station 111-2 receives electromagnetic signals from base transceiver stations 109-1, 109-2, and 109-3; likewise, mobile station 111-3 receives electromagnetic signals from base transceiver stations 109-1, 109-2, and 109-3.

Mobile stations 111-$k$ each is illustratively a smartphone with voice/text and packet data services provided and supported by wireless network 106 (whether the mobile stations are active at the same time or at different times). It will be clear to those having ordinary skill in the art, after reading the present disclosure, how to make and use telecommunications analysis server 150 to operate with a mobile station 111-$k$ that is a cell phone, a data-only tablet, or a combination thereof. Mobile stations 111-$k$ are illustratively in service at the same time, but need not be. It will be clear to those skilled in the art, after reading this disclosure, how to make and use alternative embodiments of the present invention that comprise any number of mobile stations supported by wireless network 106.

Gateway mobile location center ("GMLC") 112 is an element of the wireless network that interfaces with external systems, e.g., telecommunications analysis server 150, public safety system 104 (interconnection not shown), etc. Within wireless network 106, gateway mobile location center 112 transmits incoming location requests (e.g., from telecommunications analysis server 150, public safety system 104, etc.) to location engine 113; and receives location estimates that are generated by location engine 113 and transmitted therefrom "upstream" to gateway mobile location center 112. The GMLC 112 also extracts the required information from messages within wireless network 106 and transforms the information into the content and format required by the location engine 113. The GMLC 112 transmits location estimates received from location engine 113 to telecommunications analysis server 150 according to the illustrative embodiment.

Location engine 113 comprises hardware and software that estimates a location for a mobile station 111-$k$ (and for any mobile station served by wireless network 106). Location engine 113 is well known in the art. Preferably, location engine 113 is a mass location system that estimates a real-time location of a mobile station whenever a mobile station 111-$k$ reports a telecommunications event to its respective serving base transceiver station 109-$i$, such as a location-area-update, an attach event, a detach event, a call origination, a text transmission, a data session origination, etc. Although numerous geo-location technologies exist in the prior art, the disclosed embodiments comprise a preferred radio-frequency "fingerprinting" technology that is based on empirical radio-frequency measurements reported by each mobile station to its serving base transceiver station along with the telecommunications-event report/request; the empirical measurements collectively enable location engine 113 to estimate with good accuracy where the mobile station is located, e.g., 50-meter accuracy within 5 seconds of the request at the 67th percentile. The locational accuracy provided by location engine 113 far exceeds the cell ID or Enhanced Cell ID location estimates available from some prior art solutions, which cover relatively large geographic areas that far exceed a 50-meter radius. It should be noted that the location estimate provided by location engine 113 may comprise an uncertainty radius. As is described in more detail below according to the illustrative embodiment, the location estimate (with or without the uncertainty radius) is relevant to whether a mobile station can be said to be within earshot of a reported audio incident.

Figure 1C:
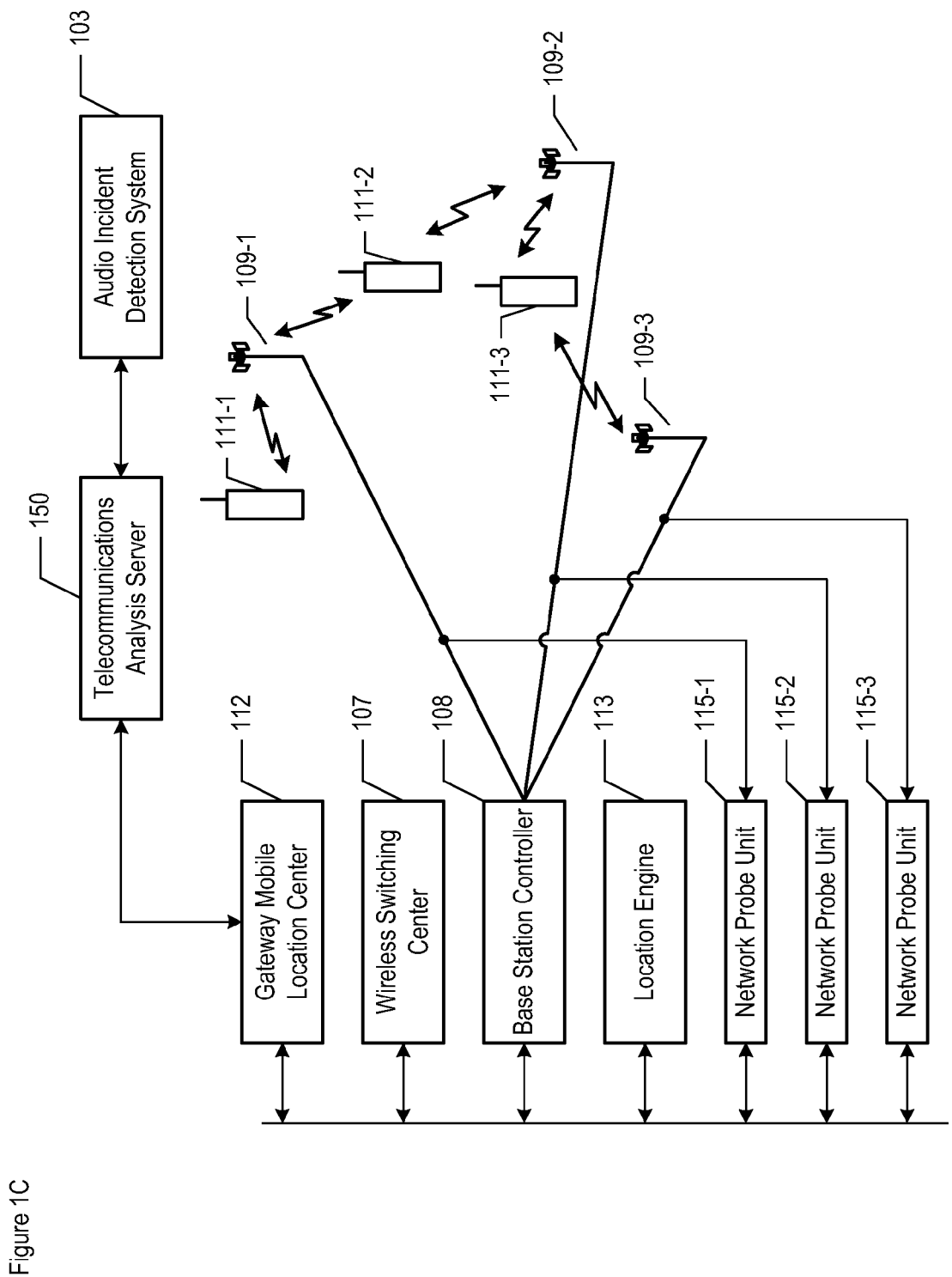
FIG. 1C depicts a schematic of the salient portions of wireless network 106 depicted in FIG. 1B shown with installed network probe units according to an alternative embodiment of the present invention.

In some alternative embodiments, the reported empirical measurements are captured via a corresponding network probe unit 115-$i$ that taps into a connection in the wireless network infrastructure as explained further in regard to FIG. 1C.

According to the illustrative embodiment, location engine 113 estimates a location for an operating mobile station, including a location from which one or more of the following occur, including call originations, user-initiated call disconnect, text transmissions, and data session originations, all of which are of particular interest in the present invention. Location engine 113 also stores the location estimates it generates accompanied by respective time stamps for future retrieval and use.

FIG. 1C depicts a schematic of the salient portions of wireless network 106 depicted in FIG. 1B shown with installed network probe units according to an alternative embodiment of the present invention. The present figure depicts network probe units 115-1, 115-2, and 115-3 (115-$i$) installed in wireless network 106 to probe the connections between the corresponding base transceiver station 109-$i$ and base station controller 108. In GSM networks, this connection is known as the Abis link. Although network probe units 115-$i$ are shown probing the Abis link, it will be clear to those having ordinary skill in the art, after reading the present disclosure, how to make and use alternative embodiments wherein network probe units are also and/or alternatively installed on other links within the wireless network, e.g., on the RF link between the mobile station and the base transceiver station, on the link between the base station controller and the wireless switching center, etc. The nomenclature, format, and functionality of these intra-network links will be known to those having ordinary skill in the art regardless of the particular air interface and operating standard of the wireless network.

Network probe units 115-$i$ (e.g., 115-1, 115-2, 115-3) are installed in wireless network 106 in conjunction with the operation of location engine 113. Each network probe unit 115-$i$ passively taps into (or probes) a connection in the wireless network infrastructure. The probe is passive, meaning that it does not interfere with or functionally affect the functioning of the connection that it probes. The probe captures the data that travels on the connection, stores and/or buffers it, and transmits it to one or more other systems where the data is archived and/or processed.

Probe technology is well known in the art. Each probe unit 115-$i$ transmits the intercepted/tapped data to location engine 113 as is well known in the art, thus enabling location engine 113 to immediately analyze the probed data and to compute an estimated location of the mobile station that transmitted the probed data. According to the alternative embodiment that is illustrated in the present figure, each probe unit 115-$i$ also transmits the intercepted/tapped data to telecommunications analysis server 150, which analyzes telecommunications data as described in further detail below. It will be clear to those having ordinary skill in the art, after reading the present disclosure, how to use network probe units 115-$i$ that are appropriate to the particular wireless network, the interface(s) being probed, and the data being probed.

Although network probe units 115-$i$ are not shown in the subsequent figures herein, it should be understood that all methods, systems, and scenarios described below can be implemented with network probe units 115-$i$ as shown in the present figure. Conversely, it should be understood that network probe units are not necessary for the proper operation of the present invention, and that all methods, systems, and scenarios described below where a network probe unit is not expressly recited can be implemented without any network probe units 115-$i$.

Figure 2:
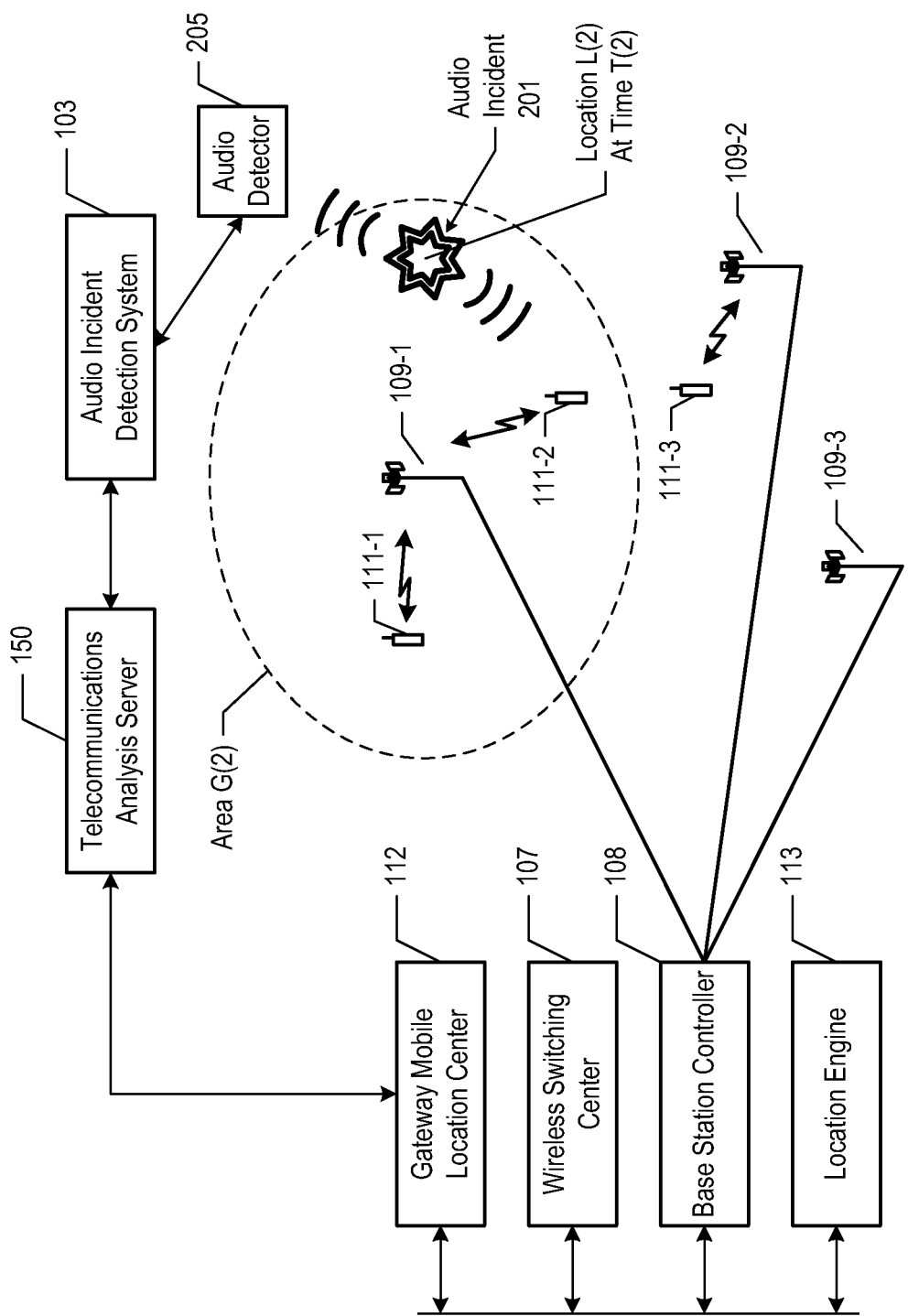
FIG. 2 depicts audio incident 201 occurring at location L(2) and time T(2) in the context of telecommunications analysis system 100.

FIG. 2 depicts audio incident 201 occurring at location L(2) and time T(2) in the context of telecommunications analysis system 100. For simplicity and ease of understanding, some of the details depicted in the preceding figures are not shown in FIG. 2. Also for simplicity, only serving-cell relationships are illustrated here with regard to the mobile stations, such that: base transceiver station 109-1 is the serving base transceiver station (serving cell) for mobile stations 111-1 and 111-2; and base transceiver station 109-2 is the serving base transceiver station (serving cell) for mobile station 111-3.

Additionally, FIG. 2 also depicts: audio incident 201, which illustratively occurs at location L(2) at time T(2); geographic area G(2), which is the cell coverage area served by base transceiver station 109-1 and which comprises location L(2); and audio detector 205. The geographic areas covered by the other base transceiver stations are not shown. According to the present figure, only geographic area G(2) comprises the location L(2) of the illustrated audio incident, i.e., only base transceiver station 109-1 covers location L(2).

Audio detector 205 is a component of audio incident detection system 103 as is well known in the art. Each audio detector 205 is a sensor that receives acoustic signals from the ambient environment and reports relevant data to audio incident detection system 103 according to technology that well known in the art. Audio detector 205 is equipped with the necessary audio sensing equipment, filters, buffers, etc. as is well known in the art. Although audio incident detection system 103 is shown equipped with only one audio detector 205, it will be clear to those having ordinary skill in the art how to configure any number of audio detectors 205. It will be clear to those having ordinary skill in the art, after reading the present disclosure, how to make and use alternative embodiments that operate with any number of audio detectors connected to audio incident detection system 103, and how to make and use alternative embodiments that operate with any number of audio incident detection systems 103.

Figure 3:
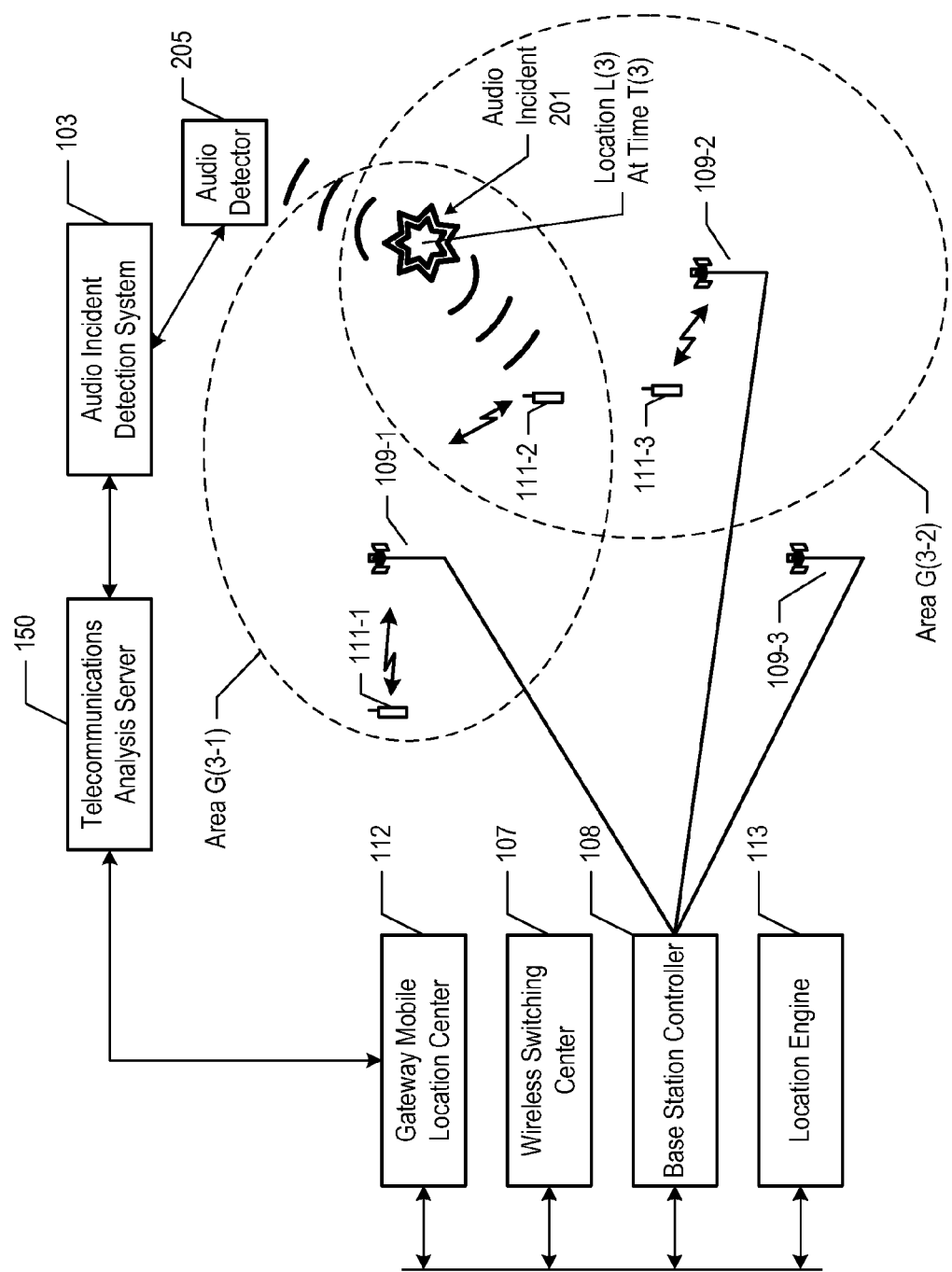
FIG. 3 depicts audio incident 301 occurring at location L(3) and time T(3) in the context of telecommunications analysis system 100.

FIG. 3 depicts audio incident 301 occurring at location L(3) and time T(3) in the context of telecommunications analysis system 100. For simplicity and ease of understanding, some of the details depicted in the preceding figures are not shown in the present figure. For simplicity, only serving-cell relationships are illustrated here with regard to the mobile stations, such that: base transceiver station 109-1 is the serving base transceiver station (serving cell) for mobile stations 111-1 and 111-2; and base transceiver station 109-2 is the serving base transceiver station (serving cell) for mobile station 111-3.

Additionally, FIG. 3 also depicts: audio incident 301, which illustratively occurs at location L(3) at time T(3); geographic area G(3-1), which is the cell coverage area served by base transceiver station 109-1 and comprises location L(3); and geographic area G(3-2), which is the cell coverage area served by base transceiver station 109-2 and also comprises location L(3). Geographic area G(3-1) overlaps in part with geographic area G(3-2), such that incident location L(3) lies within the overlap. Geographic area(s) covered by the other base transceiver station(s) are not shown and do not comprise incident location L(3). According to the present figure, geographic areas G(3-1) and G(3-2) both comprise the location L(3) of the illustrated incident, i.e., both base transceiver stations (cells) 109-1 and 109-2 cover location L(3).

Figure 4:
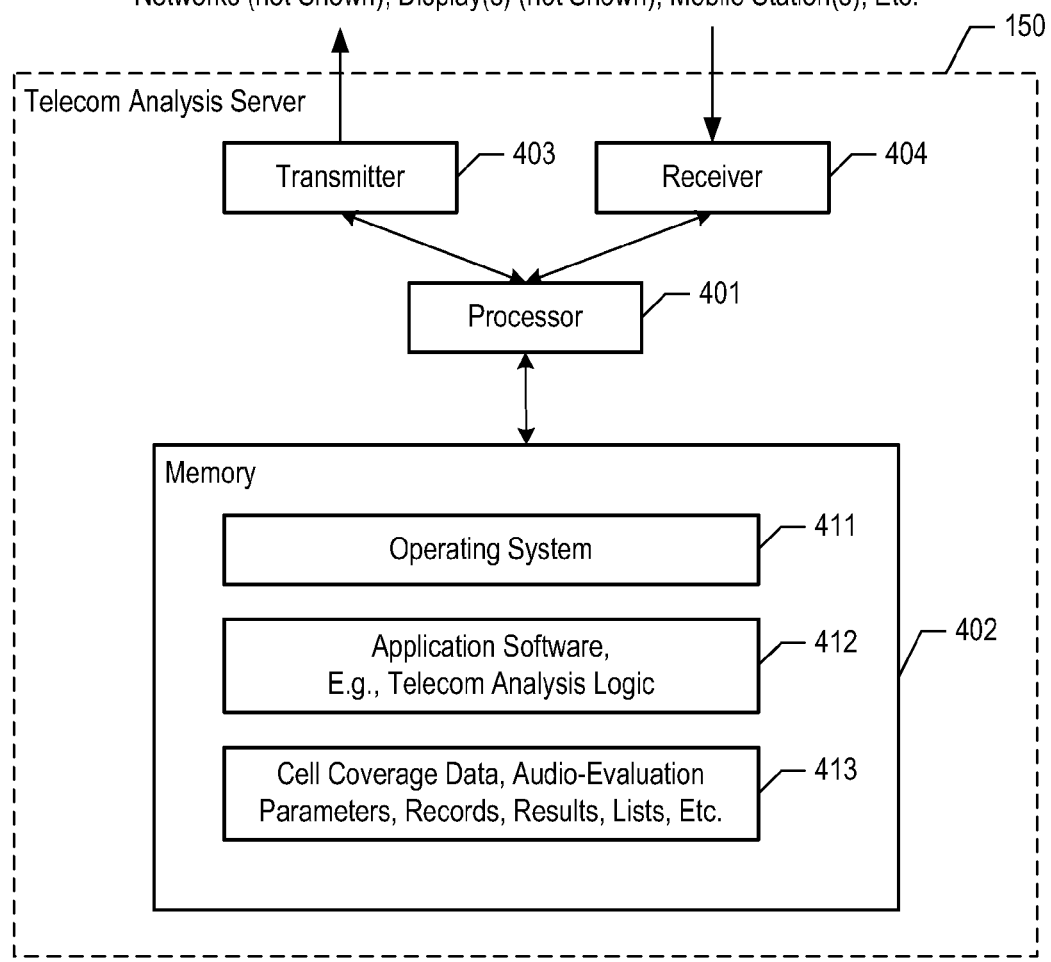
FIG. 4 depicts a schematic diagram of the hardware platform of the illustrative telecommunications analysis server 150.

FIG. 4 depicts a block diagram of the salient components of the hardware platform of telecommunications analysis server 150. According to the illustrative embodiment, telecommunications analysis server 150 is an apparatus that is a data-processing system (illustratively a server) whose hardware platform comprises: processor 401, memory 402, transmitter 403 and receiver 404.

Processor 401 is a processing device such as a microprocessor that is well known in the art. Processor 401 is configured such that, when operating in conjunction with the other components of server 150, processor 401 executes software, processes data, and telecommunicates according to the operations described herein.

Memory 402 is non-transitory and non-volatile computer storage memory technology that is well known in the art, e.g., flash, etc. Memory 402 stores operating system 411, application software 412, and element 413 that comprises data, parameters, records, results, lists, etc. The specialized application software 412 that is executed by processor 401 is illustratively denominated the "telecommunications analysis logic" that enables telecommunications analysis server 150 to perform the operations of method 500. Memory element 413 illustratively comprises the cell coverage data of wireless network 106 (and any other wireless networks that are served by telecommunications analysis server 150), and audio-evaluation parameters needed for determining whether an audio incident is within earshot of a certain location. Memory element 413 also comprises other data, records, results, lists, associations, indicators, whether of an intermediate nature, final results, or archival. It will be clear to those having ordinary skill in the art how to make and use alternative embodiments that comprise more than one memory 402; or comprise subdivided segments of memory 402; or comprise a plurality of memory technologies that collectively store operating system 411, application software 412, and element 413.

Transmitter 403 is a component that enables telecommunications analysis server 150 to telecommunicate with other components and systems by transmitting signals thereto. For example, transmitter 403 enables telecommunication pathways to wireless networks (e.g., wireless network 102, wireless network 106, and any other supported networks), public safety system 104, audio incident detection system 103, etc., other systems, the public switched telephone network, internet and private data networks, electronic displays, mobile stations, fixed stations, etc. without limitation. Transmitter 403 is well known in the art. It will be clear to those having ordinary skill in the art how to make and use alternative embodiments that comprise more than one transmitter 403. Transmitter 403 is shown in a wired configuration, but in some alternative embodiments, transmitter 403 may enable wireless telecommunications.

Receiver 404 is a component that enables telecommunications analysis server 150 to telecommunicate with other components and systems by receiving signals therefrom. For example, receiver 404 enables telecommunication pathways from wireless networks (e.g., wireless network 102, wireless network 106, and any other supported networks), public safety system 104, audio incident detection system 103, etc., other systems, the public switched telephone network, internet and private data networks, electronic displays, mobile stations, fixed stations, etc. without limitation. Receiver 404 is well known in the art. It will be clear to those having ordinary skill in the art how to make and use alternative embodiments that comprise more than one receiver 404. Receiver 404 is shown in a wired configuration, but in some alternative embodiments, receiver 404 may enable wireless telecommunications.

It will be clear to those skilled in the art, after reading the present disclosure, that in some alternative embodiments the hardware platform of telecommunications analysis server 150 can be embodied as a multi-processor platform, as a data-processing system, as a sub-component of a larger computing platform, as a virtual computing element, or in some other computing environment—all within the scope of the present invention. It will be clear to those skilled in the art, after reading the present disclosure, how to make and use the hardware platform for telecommunications analysis server 150.

Figure 5:
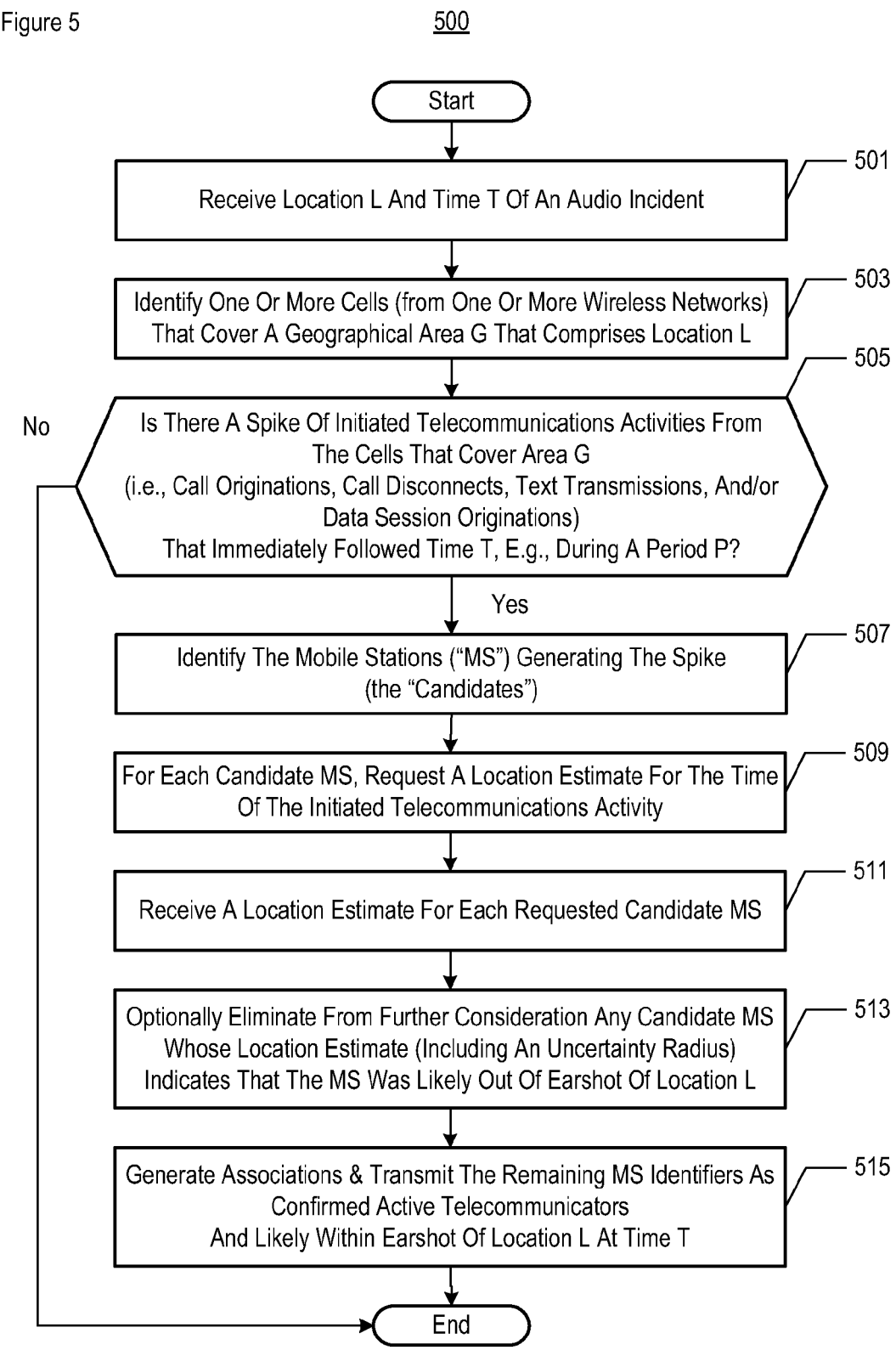
FIG. 5 depicts a flowchart of the salient operations of method 500 according to an illustrative embodiment of the present invention.

FIG. 5 depicts a flowchart of the salient operations of method 500 according to an illustrative embodiment of the present invention. Telecommunications analysis server 150 is the entity that executes and coordinates the operations of method 500 according to the illustrative embodiment of the telecommunications analysis logic. Accordingly, method 500 is launched by the receipt of location and time data representing a reported audio incident. When an audio incident is first detected, there may be some uncertainty as to whether the incident is "real," i.e., whether the audio incident actually occurred at all, and if so, whether its nature is such that authorities should be alerted and supplied with additional information to supplement an investigation of the incident. Accordingly, method 500 is primarily directed at gathering telecommunications-activity information correlating with the location and time of the audio incident—information that may corroborate the occurrence of the incident and ultimately help identify who might have been present within earshot. When telecommunications analysis server 150 operates in reference to more than one wireless network, i.e., supports more than one wireless network, the relevant sub-operations of method 500 are repeated for each of the supported wireless networks to arrive at final results. This makes sense, because the mobile stations within earshot of an incident might be served by a plurality of different wireless networks, e.g., wireless network 102 and wireless network 106, and a proper analysis would be better served by data from all wireless networks serving the geographic area of the incident.

At operation 501, telecommunications analysis server 150 receives a location L and a time T of an audio incident. This information is received, according to the illustrative embodiment, from audio incident detection system 103. In some alternative embodiments, the information is received from public safety system 104, from a law enforcement system, or from an Emergency 911 system that first received a report of an audio incident. Operation 501 is described in more detail in an accompanying figure.

At operation 503, telecommunications analysis server 150 uses the previously-received information to identify one or more cells in the supported wireless network(s), e.g., wireless network 102 and wireless network 106, that provide wireless service coverage to a geographic area G that comprises the incident location L. Operation 503 is described in more detail in an accompanying figure.

Operation 505 is a decision point. At operation 505, telecommunications analysis server 150 determines whether there is a spike in initiated telecommunications activities (i.e., call originations, user-initiated call disconnects, text transmissions, and/or data session originations) in the cells that cover geographic area G during a time period that immediately follows incident time T, e.g., period P. At operation 505, telecommunications analysis server 150 determines whether, in the general (roughly earshot) geography of the audio incident, there is a sufficiently close correlation between the time and location of the audio incident and a spike in initiated telecommunications activities immediately following it. If telecommunications analysis server 150 finds no spike in initiated telecommunications activities, method 500 ends (or optionally continues). If a spike is found, control passes to operation 507.

The subject period of time, i.e., period P that immediately follows incident time T, will be chosen by the implements. Illustratively, it is 3 minutes in duration. In general, the subject period of time should be relatively short, on the order of a few minutes, in order to provide a meaningful correlation with the incident time and accounting for people's responsive reactions to the incident, yet long enough to allow for slight delays in calling patterns and in originating text and/or data activity. Operation 505 is described in more detail in an accompanying figure.

At operation 507, telecommunications analysis server 150 identifies which mobile stations operating in wireless network 106 are generating the spike, i.e., which mobile stations initiated telecommunications activities during the subject period of time in geographic area G. These mobile stations are designated the "candidates." Set M is defined to comprise the identifiers of the candidate mobile stations, e.g., a telephone number for each mobile station, an IMSI, etc. Set M represents the pool of mobile stations that actively initiated one or more telecommunications activities immediately following the incident time T (i.e., during period P) from a location that might possibly be within earshot of incident location L. One or more of the mobile stations identified in set M could have been used by a witness, bystander, victim, or perpetrator of the audio incident. The list of candidates will be later optionally pruned to only those mobile stations whose estimated location is within likely earshot of the incident. Operation 507 is described in more detail in an accompanying figure.

At operation 509, for each candidate mobile station identified in set M, telecommunications analysis server 150 generates a request for the location of the candidate corresponding to the time when it initiated the telecommunications activity in the spike. In other words, where was each candidate mobile station at incident time T or soon thereafter (in period P) when it initiated a relevant telecommunications activity?

Operation 509 comprises a filtering function that transmits to location engine 113 location requests for only those mobile stations that generated the spike and only for such time(s) that fall within time period P—the relatively small set of candidates identified in operation 507. The time of the initiated telecommunications activity that placed a candidate mobile station in the spike, e.g., T(orig), is available from one or more sources, including the probe data obtained from a network probe unit 115-i, and/or from data collected by location engine 113, and/or from call-activity records obtained from wireless switching center 107—as described in more detail in reference to operation 505. According to the present operation, telecommunications analysis server 150 receives and/or determines the list of candidate mobile stations and the respective time when each one initiated telecommunications activity that created the spike.

For example, telecommunications analysis server 150 extracts from telecommunications-event record(s) and/or from call-activity record(s) (i) the identity of the initiating mobile station, e.g., 111-1, and (ii) the first time that mobile station 111-1 originated a call after time T, e.g., T(orig); telecommunications analysis server 150 then requests from location engine 113 a location for mobile station 111-1 at time T(orig).

This request scheme is intended to advantageously reduce the amount of data that is requested from and transmitted by location engine 113, thus minimizing network traffic and the computational burden on location engine 113. Only a limited number of requests are transmitted and they are focused on a limited set of candidate mobile stations with a limited time footprint, i.e., period P. For example, there might be a thousand powered-on mobile stations operating in a cell, but only ten that initiated telecommunications activities during the subject period of time; thus, only ten location requests would be issued in the present operation. Without the present filtering function, the present operation might have a detrimental effect on the ability of location engine 113 to perform its real-time mass-location estimation duties in support of all the other mobile stations that are operating in wireless network 106; likewise, too many requests to location engine 113 might burden the intra-network signaling links with excess traffic that could affect the operational performance of the wireless network.

It will be clear to those having ordinary skill in the art, after reading the present disclosure, how to make and use alternative embodiments wherein the present operation is differently implemented, e.g., requesting all location estimates for all mobile stations for the subject period of time and filtering the relevant candidates locally at the telecommunications analysis server 150. For example, telecommunications analysis server 150 could be implemented to automatically receive and archive (locally or in an adjunct data store 155) the location estimates generated by location engine 113 on a continuing on-going basis; in such a configuration, the present request for a location is transmitted to the local resource (e.g., data store 155) rather than to location engine 113. Control then passes to operation 511.

At operation 511, telecommunications analysis server 150 receives a location estimate for each candidate mobile station for which a request was submitted. For example, continuing the example above, telecommunications analysis server 150 receives from location engine 113 an estimated location for mobile station 111-1 corresponding to time T(orig) when 111-1 originated a call. T(orig) follows time T and is within period P, e.g., within 3 minutes of time T. In alternative embodiments, telecommunications analysis server 150 receives the estimated location for mobile station 111-1 from data store 155 and/or from memory element 413.

At operation 513, which is optional, telecommunications analysis server 150 eliminates from further consideration any candidate mobile station whose location estimate (including an uncertainty radius, if any) indicates that the mobile station was out of earshot of the incident location L; the remaining mobile stations are designated set M(local), which is a subset of set M and comprises only those mobile station identifiers with a location estimate that is deemed to be within earshot of location L. Operation 513 is described in more detail in an accompanying figure.

At operation 515, telecommunications analysis server 150 generates associations, transmits results, and archives data; based on whether a spike was inferred, telecommunications analysis server 150 corroborates the occurrence of the audio incident and transmits the mobile station identifiers in M(local) as confirmed active telecommunicators that were likely within earshot of incident location L at time T. Operation 515 is described in more detail in an accompanying figure. Method 500 then ends.

In regard to method 500, it will be clear to those having ordinary skill in the art, after reading the present disclosure, how to make and use alternative embodiments of method 500 wherein the recited operations and sub-operations are differently sequenced, grouped, or sub-divided—all within the scope of the present invention. It will be further clear to those skilled in the art, after reading the present disclosure, how to make and use alternative embodiments of method 500 wherein some of the recited operations and sub-operations are optional, are omitted, or are executed by other elements and/or systems. It will be further clear to those skilled in the art, after reading the present disclosure, how to make and use alternative embodiments of method 500 wherein telecommunications analysis server 150 supports any number of wireless networks and any number of mobile stations operating in the respective wireless networks.

Figure 6:
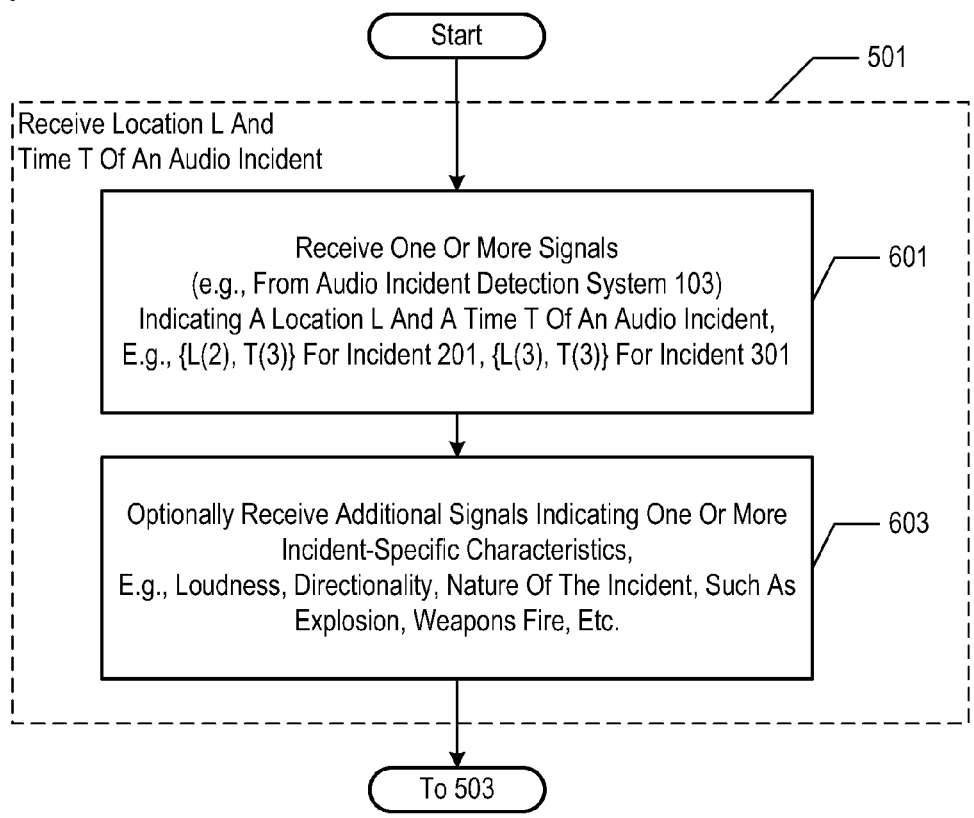
FIG. 6 depicts a flowchart of the salient sub-operations of operation 501.

FIG. 6 depicts a flowchart of the salient sub-operations of operation 501.

At operation 601, telecommunications analysis server 150 receives one or more signals indicating a location L and a time T of an audio incident. Illustratively, the one or more signals are received from audio incident detection system 103. For example, location L(2) and time T(3) are indicated for incident 201; in the case of incident 301, location L(3) and time T(3) are received.

At operation 603, which is optional, telecommunications analysis server 150 additionally receives one or more incident-specific characteristics that describe or are associated with the reported incident. This operation is optional and may be superseded by operation 1001. In the illustrative embodiment, telecommunications analysis server 150 receives from audio incident detection system 103 a loudness of the reported incident. Other incident-specific characteristics may include directionality, pitch, the estimated nature of the incident (e.g., weapons fire, explosion, etc.).

Figure 7:
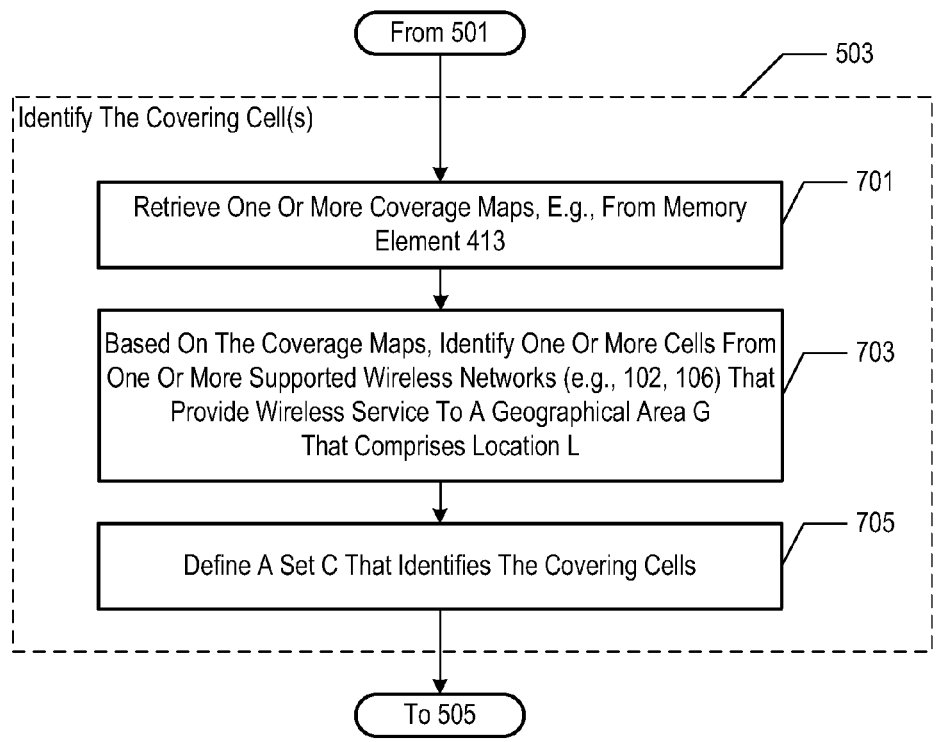
FIG. 7 depicts a flowchart of the salient sub-operations of operation 503.

FIG. 7 depicts a flowchart of the salient sub-operations of operation 503.

At operation 701, telecommunications analysis server 150 retrieves one or more coverage maps representing the geographic areas covered by the cells of the supported wireless networks, including wireless networks 102 and 106. Typically, coverage is known for a wireless network after drive testing and other empirical measurements are taken following the installation of antennas. According to the illustrative embodiments, memory element 413 comprises the coverage maps of networks 102 and 106, indicating the geographic overage provided by each base transceiver station. Coverage maps are well known in the art.

At operation 703, telecommunications analysis server 150 identifies one or more cells that provide wireless service to a geographic area G that comprises incident location L. These cells could belong to one or more of the supported wireless networks, such as cell 109-1 from wireless network 106 and another cell (not shown) from wireless network 102. Geographic area G is large enough to accommodate mobile users who are a reasonable distance away from location L, yet possibly close enough to be within earshot. Illustratively, in reference to FIG. 2, geographic area G is the same as cell coverage area G(2), which covers the location of incident 201. Illustratively, in reference to FIG. 3, geographic area G is the union of cell coverage areas G(3-1) and G(3-2), both of which cover the location of incident 301.

At operation 705, telecommunications analysis server 150 designates set C, which indentifies the covering cells, i.e., which comprises the identifiers of all the cells identified in the preceding operation. Each cell is identified by its cell identification code (e.g., "cell ID") according to the numbering scheme of the respective wireless network. Cell IDs are well known in the art. For simplicity herein, a cell ID is used synonymously with the corresponding base transceiver station identifier, e.g., 109-$i$, though persons having ordinary skill in the art understand that some configurations are possible where one base transceiver station supports a plurality of cells. Illustratively, in reference to FIG. 2, set C therefore comprises cell ID "109-1." Illustratively, in reference to FIG. 3, set C comprises cell IDs "109-1" and "109-2." It will be clear to those having ordinary skill in the art, after reading the present disclosure, how to identify each cell according to a proper numbering scheme in the wireless network and further, how to formulate and populate set C accordingly.

Figure 8:
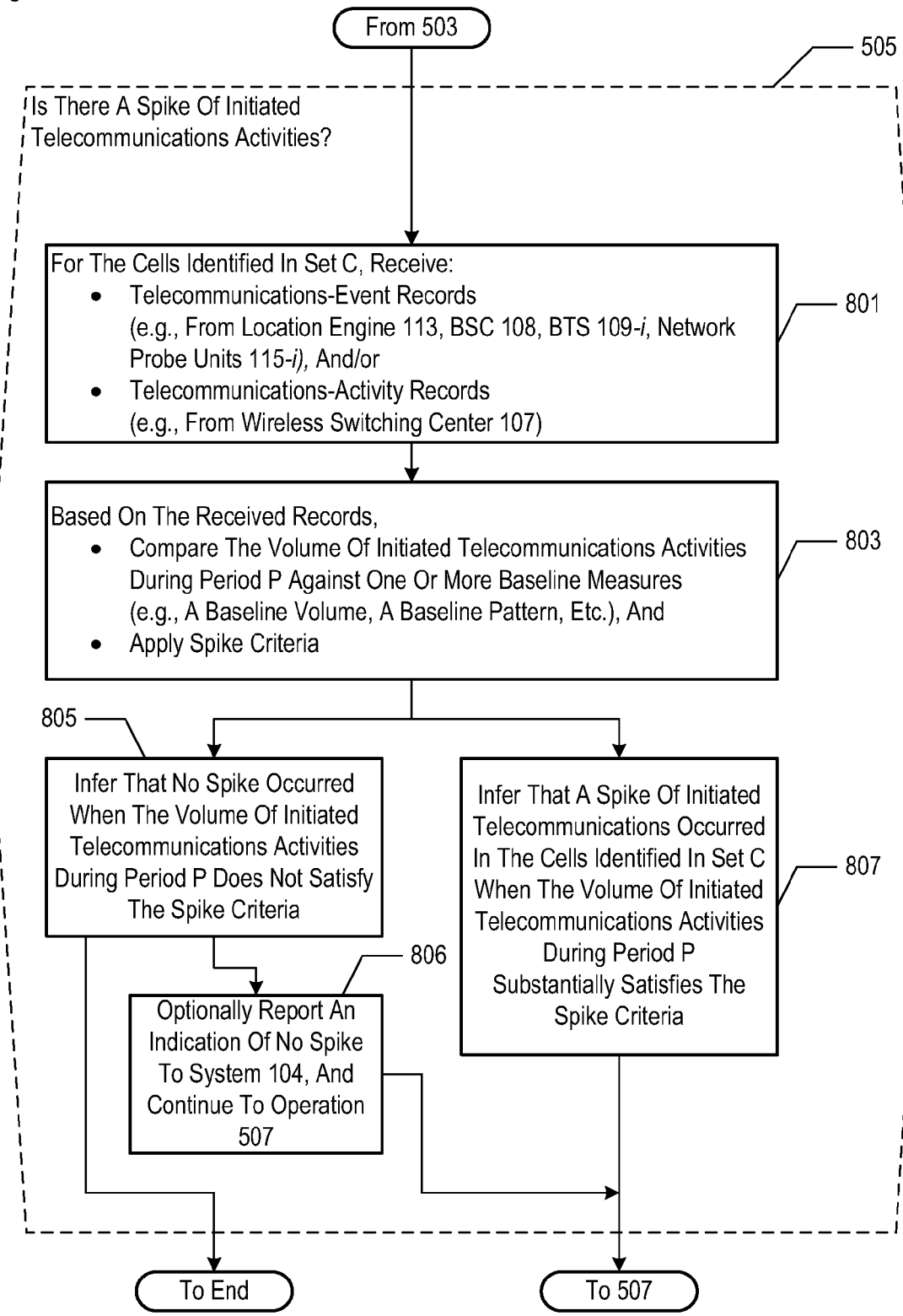
FIG. 8 depicts a flowchart of the salient sub-operations of operation 505.

FIG. 8 depicts a flowchart of the salient sub-operations of operation 505, which acts as a decision point to determine whether a spike in initiated telecommunications activities occurred from the cells identified in set C during the subject period of time, period P. It will be clear to those having ordinary skill in the art, after reading the present disclosure, how to define the parameters for detecting a spike in accordance with the needs of the implementers of the present method and also based on baseline telecommunications activities ordinarily occurring in the wireless network. For example, a wireless network with highly fluctuating call volumes might define a spike as having a substantially high call volume sufficient to overcome ordinary fluctuations; on the other hand, in a wireless network with low fluctuations, even a relatively small increase in call volume would suggest a spike. In the illustrative embodiment, a baseline volume is defined as the average number of initiated telecommunications activities per minute on the same day of week and hour of day as the incident, e.g., average Wednesday 10 a.m. volumes per minute. In the illustrative embodiment, the applicable spike criterion is a minimum 10% increase in the total volume over the subject period of time, illustratively over 3 minutes.

At operation 801, telecommunications analysis server 150 receives, for the cells identified in set C, a plurality of telecommunications-event records from one or more sources in the supported wireless networks, e.g., location engine 113, base station controller 108, base transceiver station 109-*i*, and/or network probe unit 115-*i*; and/or a plurality of telecommunications-activity records from one or more sources in the wireless network, e.g., from wireless switching center 107.

It will be clear to those having ordinary skill in the art that the records received in this operation, although based on network traffic, need not be received by telecommunications analysis server 150 from an element of wireless network 106; for example, in alternative embodiments, they might be received from an outside data-processing system responsible for collecting/generating records for one or more wireless networks, including for network 102 and 106.

At operation 803, telecommunications analysis server 150 analyzes the received records corresponding to the cells identified in set C. Based on the received records, telecommunications analysis server 150 compares the volume of initiated telecommunications activities during the subject period of time against one or more baseline measures, e.g., a baseline volume, a baseline pattern, etc. over an appropriately corresponding time frame. Illustratively, telecommunications analysis server 150 compares the volume of initiated telecommunications activities during the three minutes following incident time T against a baseline measure of average call volume for the same three minutes on the same day of week and hour of day as the incident. One or more spike criteria are applied, illustratively a minimum 10% increase in the total volume over 3 minutes of time.

At operation 805, when the volume of initiated telecommunications activities during the subject period fails to satisfy the applied spike criteria, telecommunications analysis server 150 infers that no spike occurred and method 500 ends. For example, if the total volume over 3 minutes of time increased by only 1%, no spike would be inferred in this operation. Control optionally passes to operation 806.

At operation 806, which is optional, telecommunications analysis server 150 transmits an indication that no spike occurred in the subject period of time P and passes control to operation 507. The indication is illustratively transmitted to public safety system 104.

At operation 807, when the volume of initiated telecommunications activities during the subject period satisfies the applied spike criteria, telecommunications analysis server 150 infers that a spike occurred in the cells identified in set C during the subject period of time and therefore control passes to operation 807. For example, if the total volume over 3 minutes of time increased by 50%, a spike would be inferred in this operation.

It will be clear to those having ordinary skill in the art, after reading the present disclosure, how to make and use operation 505 and its constituent sub-operations and parameters. It will be left to the implementers to obtain and define the governing baseline measures and furthermore to define appropriate criteria for determining whether the volume of initiated telecommunications activities in the subject period of time constitutes a spike as compared to one or more baselines. Baselines are developed according to techniques and technologies that are well known in the art, e.g., machine learning, according to parameters that are suited to the implementers' needs. For example, although the illustrative embodiment measures the totality of all initiated telecommunications activities against a single baseline, in an alternative embodiment, a separate baseline is used for each category of activity, i.e., call originations are analyzed separately from text transmissions which are also analyzed separately from data session originations, etc., and a spike in any one category is enough to infer that a spike occurred. It will be further clear to those having ordinary skill in the art, after reading the present disclosure, how to use and apply other statistical measures to define baselines and measure deviations from the baseline sufficient to infer whether a spike occurred.

Figure 9:
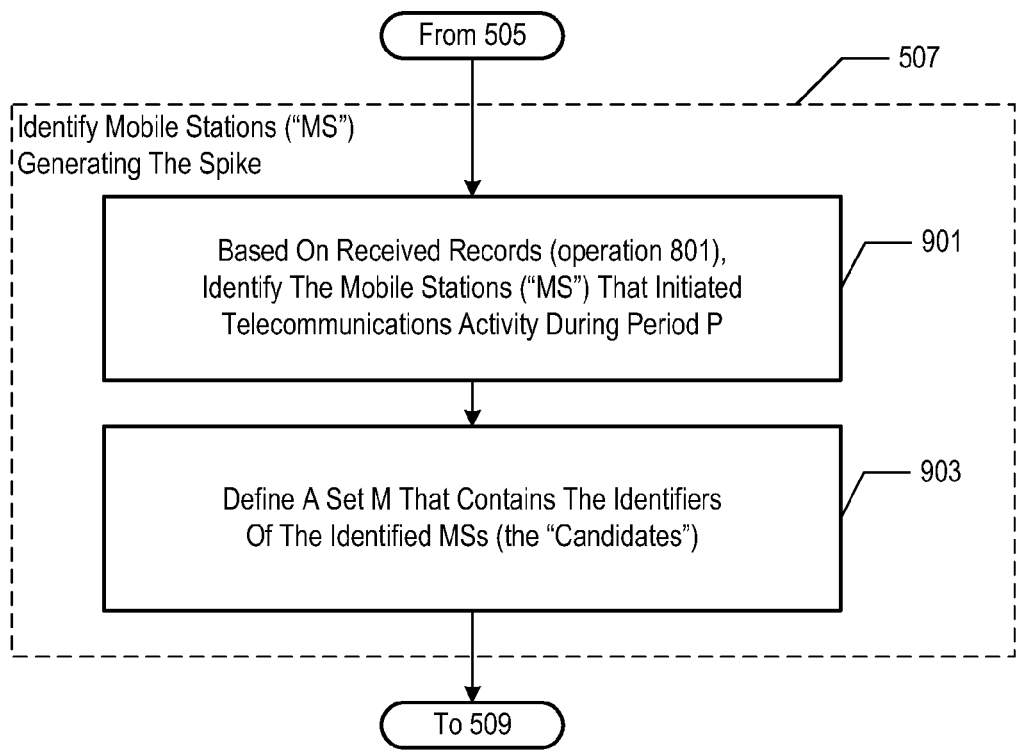
FIG. 9 depicts a flowchart of the salient sub-operations of operation 507.

FIG. 9 depicts a flowchart of the salient sub-operations of operation 507.

At operation 901, based on the records received in operation 505 (sub-operation 801), telecommunications analysis server 150 identifies the mobile stations that initiated telecommunications activities during the subject period of time (period P), i.e., the mobile stations that generated the spike. Examples of unique mobile station identifiers that might be available from the received records include one or more without limitation: IMSI, TMSI, IMEI, MSISDN (telephone number), all of which are well known in the art. The particular identifier(s) transmitted in the record depends on implementation details of the particular network, the source of the information and/or the particular link that is being probed. For example, a call-activity record from a wireless switching center might use MSISDN (telephone number) as the mobile station identifier, whereas a probed telecommunications-event record might use TMSI as the mobile station identifier. Accordingly, telecommunications analysis server 150 comprises a translation function that converts diverse identifiers into IMSI identifiers, based on one or more resources available from the wireless network. Some of the data may be pre-filtered by GMLC 112. The data is then filtered by telecommunications analysis server 150 to identify all the unique mobile stations that initiated telecommunications activity during period P. Because the received records corresponded only to the cells in set C, the resulting set of mobile stations represents all the candidates who might possibly have been within earshot of location L at time T.

At operation 903, telecommunications analysis server 150 defines set M, which comprises the above-mentioned set of identifiers of the candidate mobile stations. Set M identifies the "candidates" who might have possibly been within earshot of location L at time T.

Figure 10:
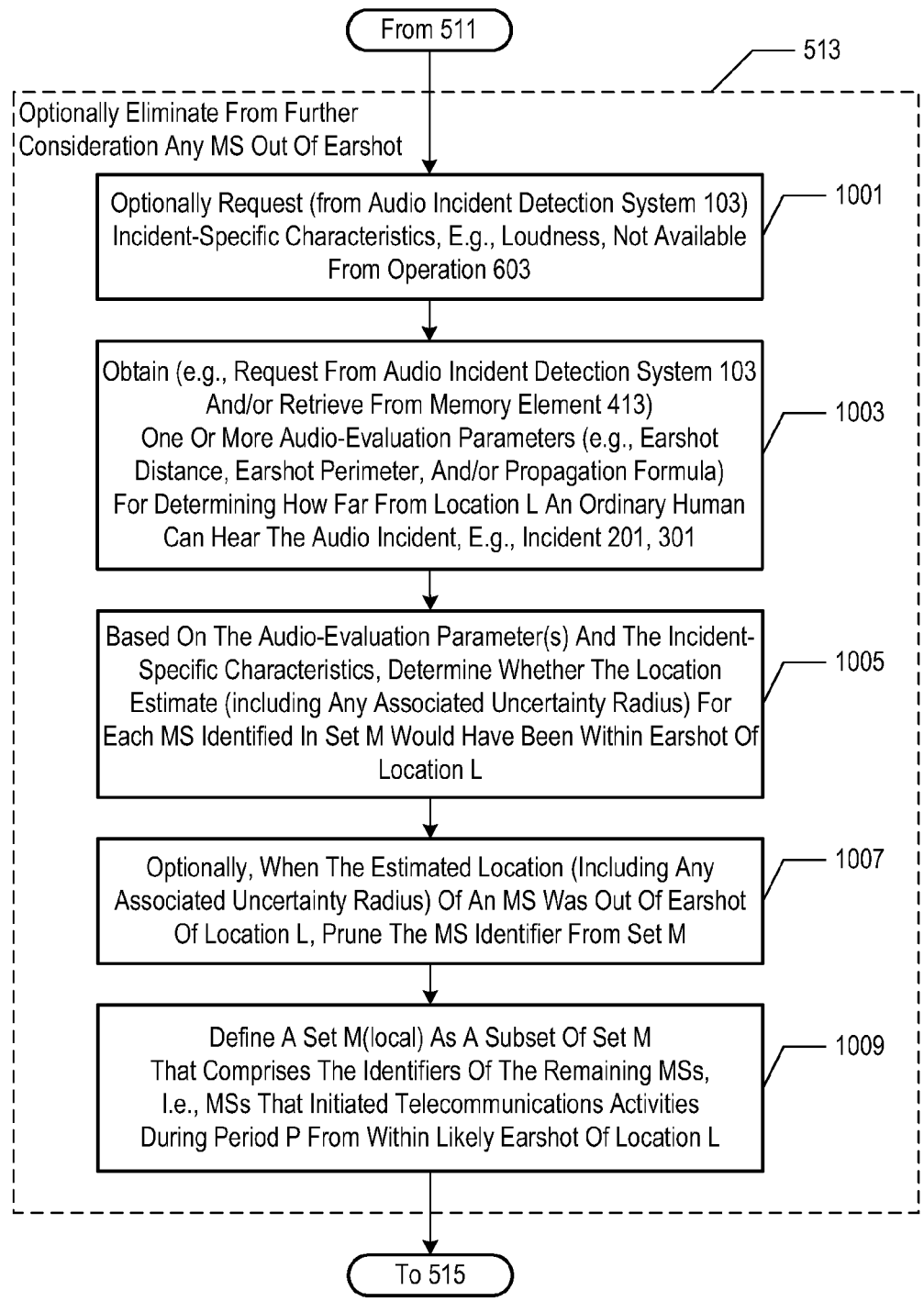
FIG. 10 depicts a flowchart of the salient sub-operations of operation 513.

FIG. 10 depicts a flowchart of the salient sub-operations of optional operation 513 according to method 500. Operation is optional. The illustrative embodiment executes operation 513 in order to eliminate from further consideration any mobile station that is determined to have been out of earshot if the audio incident (including any uncertainty radius associated with the location estimate).

At operation 1001, telecommunications analysis server 150 optionally requests incident-specific characteristics that pertain to the reported audio incident, e.g., incident 201, incident 301, if sufficient data is not available from operation 603. According to the illustrative embodiment, telecommunications analysis server 150 requests from audio incident detection system 103 at least one loudness measure that characterizes the audio incident reported for location L at time T when no such measure was received in operation 603. Other relevant incident-specific characteristics and appropriate measures will be devised by those having ordinary skill in the art after reading the present disclosure, e.g., direction, pitch, the estimated nature of the incident, etc. as deemed appropriate by the implementers of the present invention.

At operation 1003, telecommunications analysis server 150 obtains (via request from another system and/or via retrieval from a data store, e.g., data store 155, memory element 413, etc.) one or more audio-evaluation parameters for determining how far from incident location L an ordinary human can hear the reported audio incident. Illustratively, telecommunications analysis server 150 requests from audio incident detection system 103 an audio propagation formula that is based on the incident's loudness. In some configurations, telecommunications analysis server 150 requests other parameters such as an "earshot distance" that defines how far the present incident can be heard by a human, an "earshot perimeter" that defines the boundary of how far the incident can be heard from location L, etc. In some configurations, telecommunications analysis server 150 already has these parameters available in memory element 413 and/or data store 155 and retrieves them accordingly.

At operation 1005, telecommunications analysis server 150 applies the relevant audio-evaluation parameter(s) to the incident-specific characteristic(s) to determine whether the location estimate for each candidate mobile station in set M (including an uncertainty radius, if any) would have been within earshot of location L in reference to an ordinary human. In other words, does the location estimate of a given candidate mobile station place it close enough to location L so that the user could have heard the audio incident? To determine this, telecommunications analysis server 150 illustratively applies the propagation formula and loudness measure in reference to location L to each location estimate received in operation 511. In alternative embodiments, telecommunications analysis server 150 applies other audio-evaluation parameters.

At operation 1007, the candidate mobile station(s) that are deemed out of earshot of location L are optionally eliminated from further consideration. In some alternative embodiments wherein operation 513 is executed, the implementers will choose not to eliminate any candidates from further consideration, depending in some cases on the uncertainty radius that is associated with a given location estimate.

At operation 1009, the remaining candidate mobile stations are deemed to have been within earshot of location L and a subset of set M is defined as set M(local) which comprises the identifiers of the mobiles stations within likely earshot of location L. Set M(local) identifies the mobile stations that are known to have initiated telecommunications activity(ies) during the subject period of time that follows the audio incident from a location within likely earshot of the incident. These mobile stations are deemed likely to have been operated by a witness, bystander, victim, and/or perpetrator of the audio incident. Even though it is possible that any one user of these active/earshot mobile stations did not actually hear the audio incident, according to the theory of the present case, there is an increased likelihood that s/he did so and is therefore a potential witness, bystander, victim and/or perpetrator in reference to the audio incident.

When optional operation 1007 is skipped, set M and set M(local) are identical.

Figure 11:
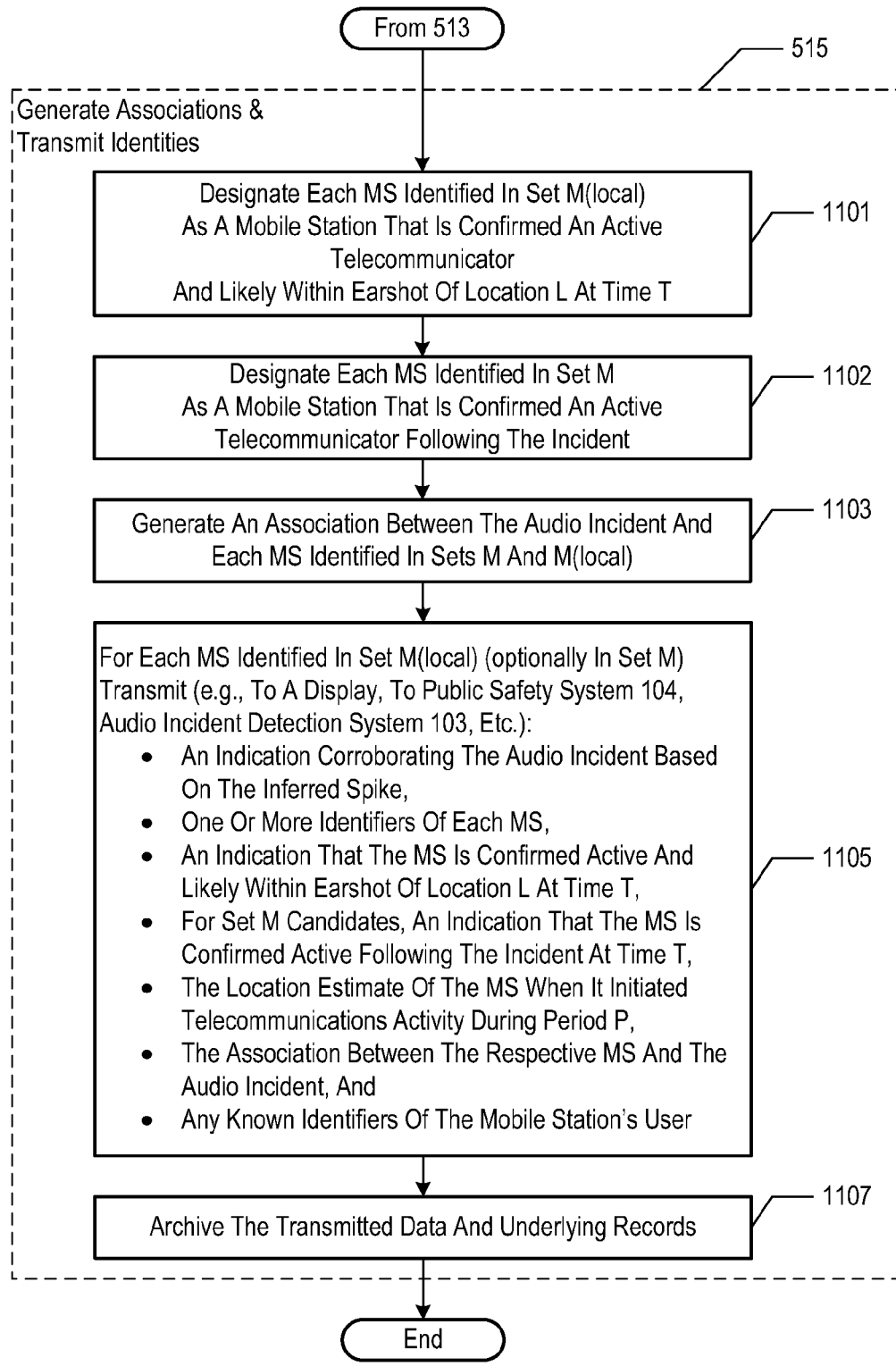
FIG. 11 depicts a flowchart of the salient sub-operations of operation 515.

FIG. 11 depicts a flowchart of the salient sub-operations of operation 515 according to method 500.

At operation 1101, telecommunications analysis server 150 designates each mobile station in set M(local) as a mobile station that is confirmed an active telecommunicator and likely within earshot of location L at time T. This designation is important, because it is based on actual evidence that the mobile station was not only active, but its user pro-actively initiated one or more telecommunications activities at a time immediately following the audio incident at issue. Moreover, according to the illustrative embodiment, the mobile station is estimated to have been within earshot of the incident location L. According to the theory of the present case, the pro-active initiation of telecommunications immediately after the audio incident occurring from a location within earshot of the incident suggests that the mobile user responded to the occurrence of the incident and could be potentially a witness, bystander, victim, or perpetrator of the incident. In this operation, a mobile station that was previously considered a "candidate" now figuratively advances to the status of "local."

At operation 1102, telecommunications analysis server 150 designates each candidate mobile station identified in set M as a confirmed active telecommunicator following the incident.

At operation 1103, telecommunications analysis server 150 generates an association between the audio incident and each "local" mobile station in set M(local). Also, telecommunications analysis server 150 generates an association between the audio incident and each "candidate" mobile station in set M. Additionally, telecommunications analysis server 150 identifies and generates other associations, indicators, and relationships that are to be transmitted in the next operation. For example, telecommunications analysis server 150: generates an indication that confirms that a "local" mobile station actively initiated telecommunications activity and was likely within earshot of location L at time T; generates an indication that confirms that a "candidate" mobile station actively initiated telecommunications activity following the incident at time T and is a candidate for further investigation; determines any known identifiers of the user of the mobile station, e.g., user's name, address of the subscriber account, etc.

At operation 1105, telecommunications analysis server 150 transmits information to one or more other systems, and/or to a display, as configured by the implementers. Telecommunications analysis server 150 is configured to transmit the information enumerated below to one or more of: a display, public safety system 104, audio incident detection system 103, a mobile station, a fixed station, a law enforcement system, an emergency response system, a surveillance system, etc. and/or a combination thereof. Thus, for each "local" mobile station identified in set M(local), or optionally for each "candidate" identified in set M, telecommunications analysis server 150 transmits:

an indication that corroborates the occurrence of the audio incident based on the inferred spike in initiated telecommunications activities, i.e., validating that the audio incident was immediately followed by a spike and is likely an incident of interest to the authorities, e.g., a likely breach-of-the-peace in contrast to a benign business-as-usual incident, one or more identifiers of the mobile station, e.g., the IMSI of the mobile station/SIM card, the telephone number of the subscriber account, TMSI, etc.;

an indication confirming that the mobile station actively initiated telecommunications activity and was likely within earshot of location L at time T;

for set M candidates, an indication confirming that the mobile station actively initiated telecommunications activity following the incident at time T and is a "candidate" for further investigation, the location estimate of the respective mobile station when it initiated the telecommunications activity (and the uncertainty radius, if any); and the association between the mobile station and the audio incident; and any known identifiers of the user of the mobile station, e.g., user's name, address of the subscriber account, etc.

At operation 1107, telecommunications analysis server 150 stores and archives the transmitted data and the underlying records, e.g., incident-specific characteristics, etc., for possible use at a future time. Illustratively, the data is archived in memory element 413, but in alternative embodiments a separate data store (e.g., data store 155) is used for archiving.

It is to be understood that the present disclosure teaches just some examples of illustrative embodiments according to the present invention and that many variations of the invention can be devised by those skilled in the art after reading this disclosure. The scope of the present invention is to be determined by the following claims.

What is claimed is:

1. A method comprising:
    receiving, by a server, an indication of a location L and an indication of a time T;
    identifying, by the server, at least one cell in a wireless network that serves a geographic area G that comprises location L;
    inferring by the server, based on a plurality of telecommunications-event records for the identified at least one cell, that a spike in initiated telecommunications activities occurred during a period of time P that follows the time T, wherein the spike comprises a first telecommunications activity that was initiated by a first mobile station; and
    transmitting, based on an estimated location of the first mobile station when the first mobile station initiated the first telecommunications activity, an indication that the first mobile station was located within the geographic area G at the time T.

2. The method of claim 1 wherein the first telecommunications activity comprises at least one of (i) a call origination, (ii) a text message transmission, and (iii) a data session origination.

3. The method of claim 1 wherein the spike comprises a volume of initiated telecommunications activities that substantially exceeds a baseline measure of initiated telecommunications activities in the geographic area G.

4. The method of claim 1 further comprising:
    transmitting by the server, based on inferring the spike in initiated telecommunications activities, an indication that the spike corroborates an occurrence of an audio-incident that is defined by location L and time T.

5. The method of claim 1 wherein the estimated location of the first mobile station is based on information reported by the mobile station to an element of the wireless network during the period of time P.

6. The method of claim 1 further comprising:
    when the server determines that the estimated location of the mobile station exceeds an earshot-distance from the location L, inferring by the server that the mobile station was not located within earshot of the location L at the time T.

7. The method of claim 1 further comprising:
    when the server determines that the estimated location of the mobile station was within earshot of the location L, transmitting by the server an indication that the first mobile station initiated the first telecommunications activity from the estimated location during the period of time P.

8. The method of claim 1 wherein an indication that the first mobile station was located within earshot of location L at time T comprises an association between an identity of the first mobile station and an audio-incident that is defined by location L and time T.

9. An apparatus comprising:
    a receiver that is configured to receive an indication of a location L and an indication of a time T;
    a processor that is configured to:
        identify at least one cell in a wireless network that serves a geographic area G that comprises the location L,
        infer, based on a plurality of telecommunications-event records for the identified at least one cell, that a spike in initiated telecommunications activities occurred during a period of time P that follows the time T, wherein the spike comprises a first telecommunications activity that was initiated by a first mobile station, and wherein the first telecommunications activity comprises at least one of (i) a call origination, (ii) a text message transmission, and (iii) a data session origination, and
        when determining that an estimated location of the first mobile station during the period P is within an earshot-distance of the location L, generate an indication that the first mobile station was located within earshot of the location L at the time T; and
    a transmitter that is configured to transmit the indication.

10. The apparatus of claim 9 wherein the indication that the first mobile station was located within earshot of the location L at the time T further indicates that the first mobile station initiated the first telecommunications activity during the period of time P.

11. A method comprising:
    inferring by a server, based on a plurality of telecommunications-event records for a cell in a wireless network, that a spike in initiated telecommunications activities occurred in the cell during a period of time P, wherein the spike comprises a first telecommunications activity that was initiated by a first mobile station;
    identifying, by the server, a geographic area G that is served by the cell;
    determining, by the server, that a sufficient correlation exists between (i) a time T and a location L that define an audio-incident and (ii) the period of time P and the geographic area G, respectively, wherein the period of time P follows the time T, and further wherein the geographic area G comprises the location L; and
    transmitting by the server, based on determining that the correlation is sufficient, an indication that the spike corroborates the occurrence of the audio-incident.

12. The method of claim 11 further comprising:
    when the server determines that an estimated location of the first mobile station during the period of time P is within an earshot-distance of the location L, inferring by the server that the first mobile station was located within earshot of the location L at the time T; and
    transmitting by the server an indication that the first mobile station was located within earshot of the location L at the time T.

13. The method of claim 12 wherein the indication that the first mobile station was located within earshot of the location L at the time T further indicates that the first mobile station initiated the first telecommunications activity during the period of time P.

14. The method of claim 11 further comprising:
    identifying, by the server, a user of the first mobile station, and
    transmitting, by the server, an indication that the identified user of the first mobile station was located within earshot of the location L at the time T.

15. The method of claim 11 further comprising:
    transmitting, by the server, an indication that indicates at least one of:
        (i) that the first mobile station was located within earshot of the location L at the time T, and (ii) that the first mobile station initiated a telecommunications activity during the period of time P, and (iii) that the first mobile station initiated during the period of time P at least one of (i) a call origination, (ii) a text message transmission, and (iii) a data session origination.

16. The method of claim 11 further comprising:

when the server determines that an estimated location of the first mobile station during the period of time P exceeds an earshot-distance from the location L, inferring by the server that the mobile station was not located within earshot of the location L at the time T.

17. The method of claim 11 wherein the inferring by server that a spike in initiated telecommunications activities occurred in the cell during the period of time P, is also based on a plurality of call-activity records for the cell.

18. An apparatus comprising:

a processor that is configured to:

infer, based on a plurality of telecommunications-event records for a cell in a wireless network, that a spike in initiated telecommunications activities occurred in the cell during a period of time P, wherein the spike comprises a first telecommunications activity that was initiated by a first mobile station;

identify a geographic area G that is served by the cell;

determine that a sufficient correlation exists between (i) a time T and a location L that define an audio-incident and (ii) the period of time P and the geographic area G, respectively, wherein the period of time P follows the time T, and further wherein the geographic area G comprises the location L;

cause a transmitter to transmit, based on determining that the correlation is sufficient, an indication that the spike corroborates the occurrence of the audio-incident.

19. The apparatus of claim 18 further comprising:

the transmitter that is configured to transmit the indication that the spike corroborates the occurrence of the audio-incident.

20. The apparatus of claim 18 further comprising:

the transmitter that is configured to transmit an indication that the first mobile station was located within earshot of the location L at the time T.

21. The apparatus of claim 18 further comprising:

the transmitter that is configured to transmit an indication that the first mobile station initiated a telecommunications activity during the period of time P from the estimated location of the first mobile station.

22. The apparatus of claim 18 wherein the processor is further configured to:

identify a user of the first mobile station, and wherein the transmitter is further configured to transmit an indication that the identified user of the first mobile station was located within earshot of the location L at the time T.

23. A method comprising:

receiving, by a server, an indication of a location L and an indication of a time T;

identifying, by the server, at least one cell in a wireless network that serves a geographic area G that comprises location L;

inferring by the server, based on a plurality of telecommunications-activity records for the identified at least one cell, that a spike in initiated telecommunications activities occurred during a period of time P that follows the time T, wherein the spike comprises a first telecommunications activity that was initiated by a first mobile station; and transmitting by the server an indication that the spike in initiated telecommunications activities occurred after time T.

24. The method of claim 23 further comprising:

transmitting, based on an estimated location of the first mobile station when the first mobile station initiated the first telecommunications activity, an indication that the first mobile station was located within the geographic area G at the time T.

25. The method of claim 23 further comprising:

when the server determines that an estimated location of the first mobile station during the period of time P is within an earshot-distance of the location L, inferring by the server that the first mobile station was located within earshot of the location L at the time T; and transmitting by the server an indication that the first mobile station was located within earshot of the location L at the time T.

26. A method comprising:

inferring by a server, based on a plurality of telecommunications-activity records for a cell in a wireless network, that a spike in initiated telecommunications activities occurred in the cell during a period of time P, wherein the spike comprises a first telecommunications activity that was initiated by a first mobile station;

identifying, by the server, a geographic area G that is served by the cell;

determining, by the server, that a sufficient correlation exists between (i) a time T and a location L that define an audio-incident and (ii) the period of time P and the geographic area G, respectively, wherein the period of time P follows the time T, and further wherein the geographic area G comprises the location L; and transmitting by the server, based on determining that the correlation is sufficient, an indication that the spike corroborates the occurrence of the audio-incident.

27. The method of claim 26 further comprising:

when the server determines that an estimated location of the first mobile station during the period of time P is within an earshot-distance of the location L, inferring by the server that the first mobile station was located within earshot of the location L at the time T; and transmitting by the server an indication that the first mobile station was located within earshot of the location L at the time T.

28. The method of claim 26 wherein the indication that the first mobile station was located within earshot of the location L at the time T further indicates that the first mobile station initiated the first telecommunications activity during the period of time P.

29. An apparatus comprising:

a processor that is configured to:

infer, based on a plurality of telecommunications-activity records for a cell in a wireless network, that a spike in initiated telecommunications activities occurred in the cell during a period of time P, wherein the spike comprises a first telecommunications activity that was initiated by a first mobile station, identify a geographic area G that is served by the cell, determine that a sufficient correlation exists between (i) a time T and a location L that define an audio-incident and (ii) the period of time P and the geographic area G, respectively, wherein the period of time P follows the time T, and further wherein the geographic area G comprises the location L, and cause a transmitter to transmit, based on determining that the correlation is sufficient, an indication that the spike corroborates the occurrence of the audio-incident; and the transmitter that is configured to transmit the indication.

30. The apparatus of claim 29 wherein the processor is further configured to:
determine that an estimated location of the first mobile station during the period of time P is within an earshot-distance of the location L,
infer that the first mobile station was located within earshot of the location L at the time T, and
cause the transmitter to transmit an indication that the first mobile station was located within earshot of the location L at the time T.

* * * * *